(12) United States Patent
Shiraishi et al.

(10) Patent No.: US 6,717,993 B1
(45) Date of Patent: Apr. 6, 2004

(54) RECEIVER

(75) Inventors: Kenichi Shiraishi, Yokohama (JP); Akihiro Horii, Zama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/581,556

(22) PCT Filed: Jan. 22, 1999

(86) PCT No.: PCT/JP99/00249

§ 371 (c)(1),
(2), (4) Date: Jul. 14, 2000

(87) PCT Pub. No.: WO99/39485

PCT Pub. Date: Aug. 5, 1999

(30) Foreign Application Priority Data

Jan. 29, 1998 (JP) ............................................ 10-033732

(51) Int. Cl.[7] .............................. H03D 3/22; H04L 27/22
(52) U.S. Cl. ....................................................... 375/329
(58) Field of Search ................................. 375/329, 330, 375/331, 332, 316, 279, 280

(56) References Cited

U.S. PATENT DOCUMENTS 4,641,323 A * 2/1987 Tsang .......................... 375/324
5,771,224 A * 6/1998 Seki et al. ................... 375/264
6,292,477 B1 * 9/2001 Ohgoshi et al. ............. 375/362

* cited by examiner

*Primary Examiner*—Mohammad H. Ghayour
*Assistant Examiner*—Demetria Williams
(74) *Attorney, Agent, or Firm*—Eric J. Robinson; Robinson Intellectual Property Law Office, P.C.

(57) ABSTRACT

To provide a receiver not requiring any large circuit. A carrier-wave-phase-error table 15-1A for BPSK modulation in which a range equal to or more than 0 of I-axis is defined is prepared for a carrier-wave regenerating circuit 10A of a demodulating circuit 1A for orthogonally detecting a received signal in which digital signals according to BPSK, QPSK, and 8PSK modulations are time-multiplexed and outputting I and Q symbol-stream data $I_t$ and $Q_t$ for each symbol. When a remapper 7A outputs $I_{0t}$ and $Q_{0t}$ obtained by inversely phase-rotating $I_t$ and $Q_t$ by $-\Theta$ against a received-signal-phase rotation angle $\Theta$ and generating an absolute phase of $I_t$ and $Q_t$, a phase-error detecting circuit 70 obtains a shift angle $\Theta'$ up to a target phase convergent angle of a received-signal point shown by $I_{0t}$ and $Q_{0t}$ viewed in the positive direction of I-axis according to a modulation system currently demodulated, reads phase error data corresponding to $I_{1t}$ and $Q_{1t}$ obtained by phase-rotating $I_t$ and $Q_t$ by $-(\Theta+\Theta')$ by the remapper 7A through time sharing out of the table 15-1A, and corrects a phase of a reference carrier wave so that the phase error data becomes zero.

2 Claims, 30 Drawing Sheets

DOMAIN OF PHASE ERROR TABLE

FIG. 9
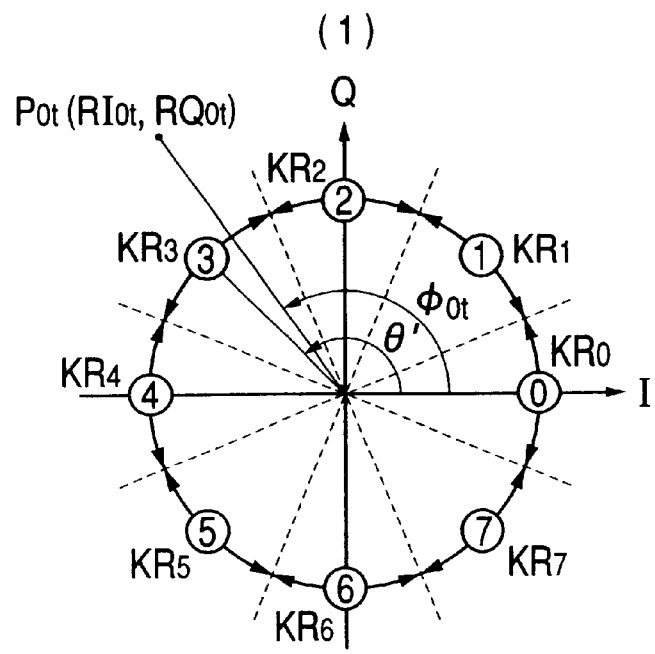
(1)
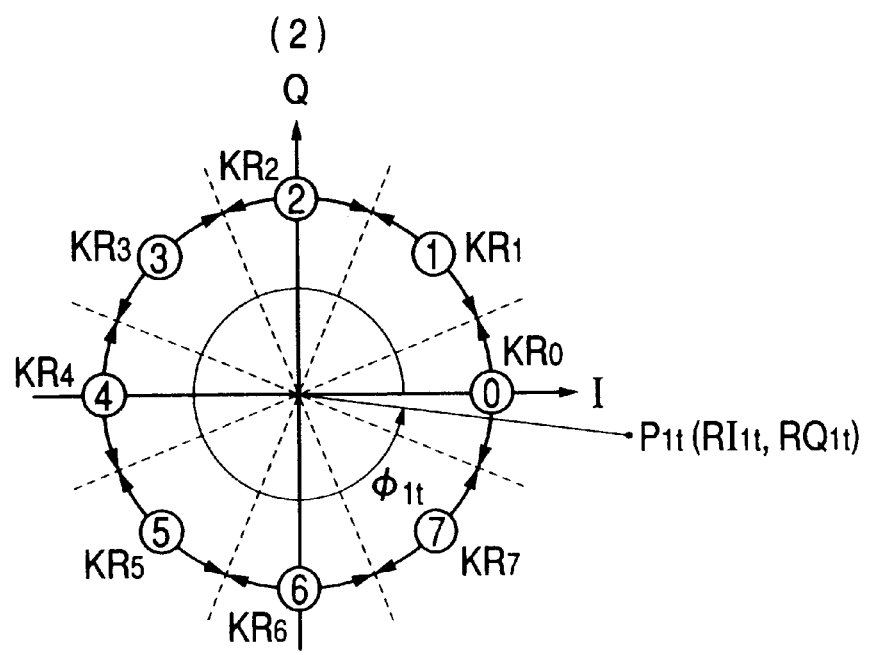
(2)

FIG. 20
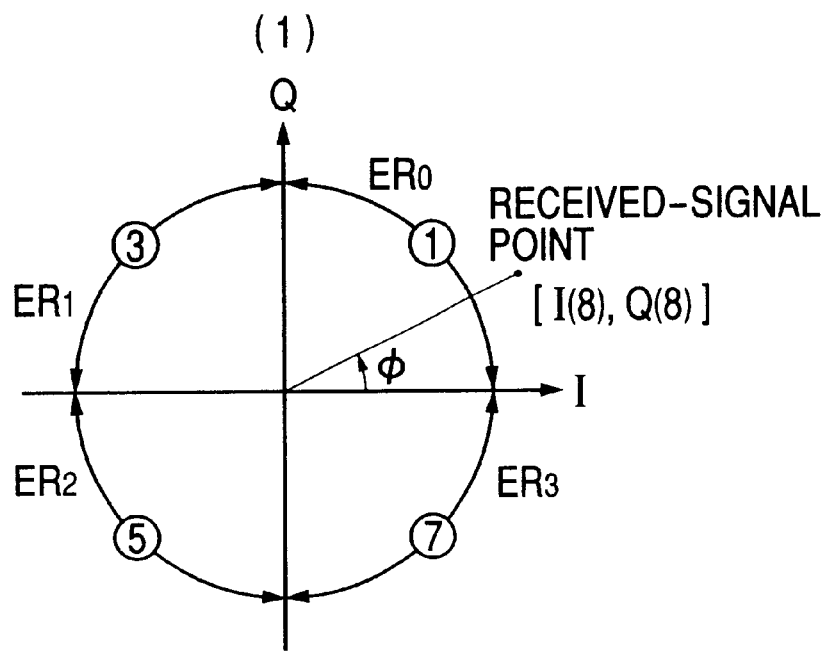
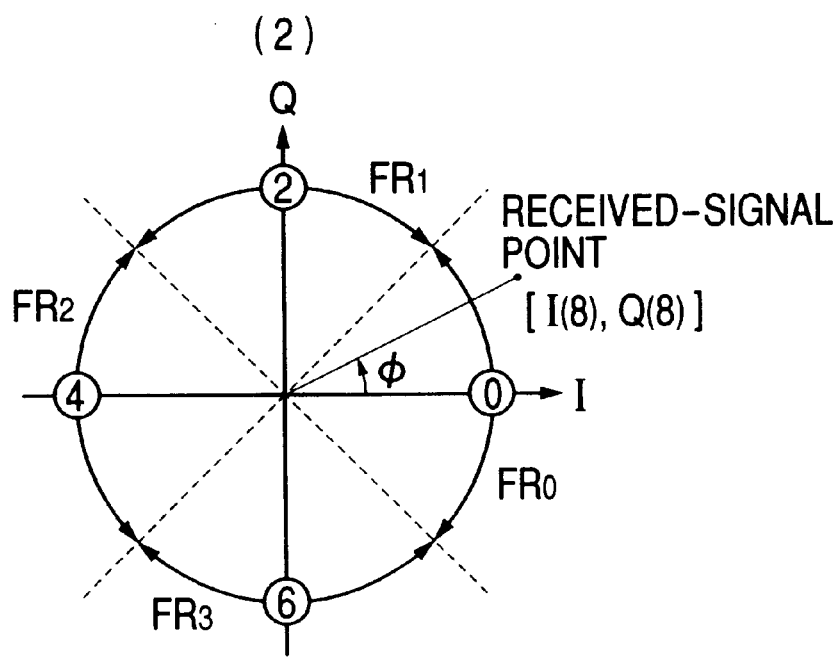

FIG. 27
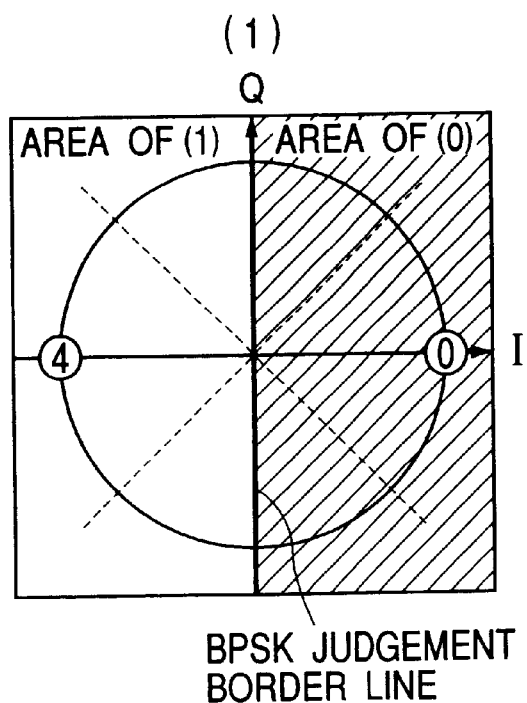
(1)
BPSK JUDGEMENT BORDER LINE
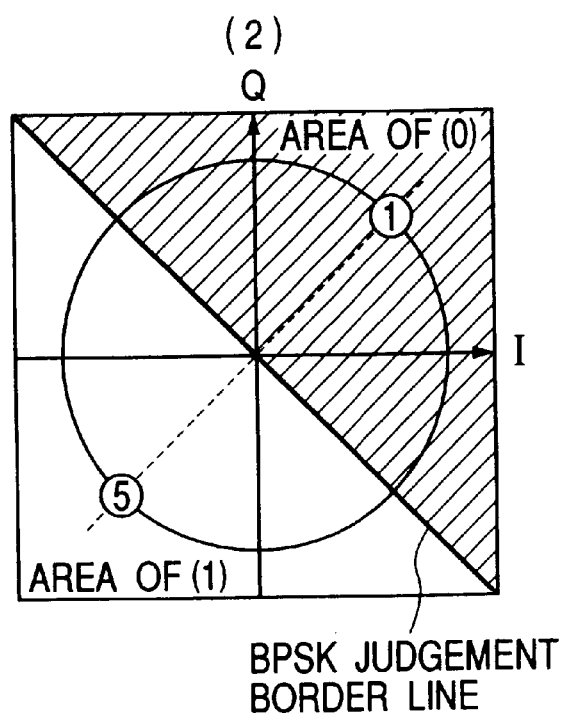
(2)
BPSK JUDGEMENT BORDER LINE

FIG. 30
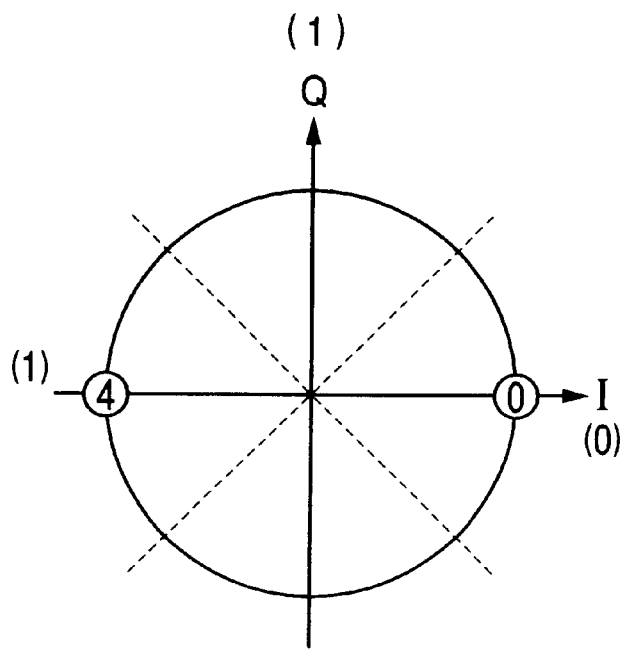
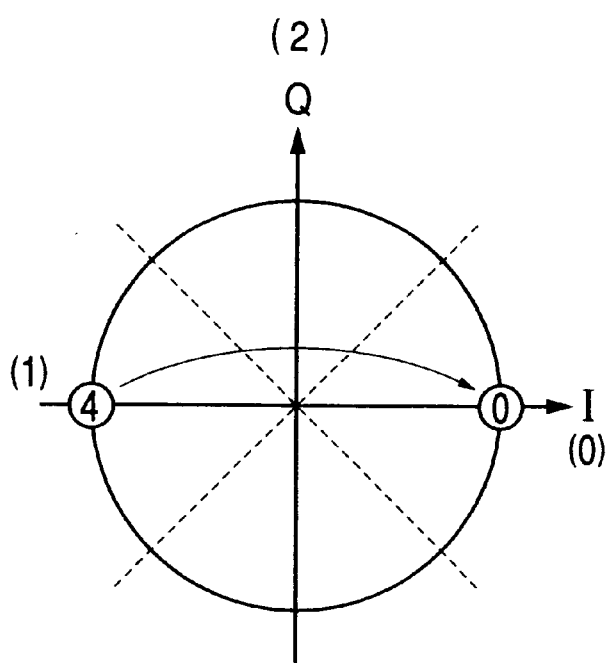

RECEIVER

TECHNICAL FIELD

The present invention relates to a receiver, particularly to a receiver for demodulating a signal to be PSK-modulated in which digital signals modulated by 2-, 4-, and 8-phase PSK modulation systems are time-multiplexed in accordance with a hierarchical transmission system or the like by using a carrier wave regenerated by carrier-wave regenerating means to output I and Q symbol-stream data.

BACKGROUND ART

Practical use of digital satellite TV broadcast is advanced which conforms to a plurality of modulation systems having necessary C/Ns different from each other such as hierarchical transmission systems in which a wave to be 8PSK-modulated, a wave to be QPSK-modulated, and a wave to be BPSK-modulated are time-multiplexed and repeatedly transmitted with frame.

FIG. 11(1) is an illustration showing a frame configuration of a hierarchical transmission system. One frame is configured by a frame-synchronizing-signal pattern comprising 32 BPSK-modulated symbols (20 latter-half symbols among 32 symbols are actually used as frame-synchronizing signal), a TMCC (Transmission and Multiplexing Configuration Control) pattern comprising 128 BPSK-modulated symbols to identify a multiple transmission configuration, a super-frame identifying signal pattern comprising 32 symbols (20 latter-half symbols among 32 symbols are actually used as super-frame identifying signal), a main signal of 203 8PSK(trellis-codec-8PSK)-modulated symbols, a burst symbol signal (BS) of four symbols in which a pseudo random noise (PN) signal is BPSK-modulated, a main signal of 202 8PSK(trellis-codec-8PSK)-modulated symbols, a burst symbol signal (BS) of four symbols in which a pseudo random noise (PN) signal is BPSK-modulated, . . . , a main signal of 203 QPSK-modulated symbols, a burst symbol signal (BS) of four symbols in which a pseudo random noise (PN) signal is BPSK-modulated, a main signal of 203 QPSK-modulated symbols, and a burst symbol signal (BS) of four BPSK-modulated symbols in order.

In case of a receiver for receiving a digital wave to be modulated (wave to be PSK-modulated) according to a hierarchical transmission system, an intermediate-frequency signal of received signals received by a receiving circuit is demodulated by a demodulating circuit and two-series I and Q base-band signals (hereafter, I and Q base-band signals are also referred to as I and Q symbol-stream data) showing instantaneous values of I-axis and Q-axis orthogonal to each other for each symbol are obtained. Absolute phase generation to be fitted to a transmission-signal phase angle is performed by an absolute-phase generating circuit by acquiring a frame-synchronizing signal from the demodulated I and Q base-band signals, obtaining the present received-signal-phase rotation angle from a signal point arrangement of the acquired frame-synchronizing signal, and inversely rotating the phase of the demodulated I and Q base-band signals on the basis of the obtained received-signal phase rotation angle.

As shown in FIG. 12, an absolute-phase generating circuit of a receiver for receiving a wave to be PSK-modulated according to a conventional hierarchical transmission system is configured by a frame-sync detecting/regenerating circuit 2 serving as frame-synchronizing-signal acquiring means provided for the output side of a demodulating circuit 1 to acquire a frame-synchronizing signal, a remapper 7 serving as inversely-phase-rotating means comprising a ROM, and a received-signal-phase-rotation-angle detecting circuit 8 serving as received-signal-phase-rotation-angle detecting means. Symbol 9 denotes a transmission-configuration identifying circuit for identifying the multiple transmission configuration shown in FIG. 11(1), which outputs a two-bit modulation-system identifying signal DM.

The demodulating circuit 1 orthogonally detects intermediate-frequency signals to obtain I and Q base-band signals. In the demodulating circuit 1, symbol 10 denotes a carrier-wave regenerating circuit to regenerate two reference carrier waves $f_{c1}$ (=cosωt) and $f_{c2}$ (=sinωt) orthogonal to each other with phases shifted from each other by 90° because a frequency and a phase synchronize with a carrier wave before modulated in inputs of the demodulating circuit 1. Symbols 60 and 61 denote multipliers for multiplying an intermediate-frequency signal IF by $f_{c1}$ and $f_{c2}$, 62 and 63 denote A/D converters for A/D-converting outputs of the multipliers 60 and 61 at a sampling rate two times larger than a symbol rate, 64 and 65 denote digital filters for applying band restriction to outputs of the A/D converters 62 and 63 through digital-signal processing, 66 and 67 denote thinning circuits for thinning outputs of the digital filters 64 and 65 to 1/2 sampling rate and outputting two series of I and Q base-band signals (I and Q symbol-stream data) showing instantaneous values of I-axis and Q-axis for each symbol. The thinning circuits 66 and 67 transmit two series of I and Q base-band signals I(8) and Q(8) (a numeral in parentheses denotes the number of quantization bits which is hereafter also simply referred to as I and Q) respectively having 8 quantization bits (two's complement system).

Mapping for each modulation system at the transmission side is described below by referring to FIGS. 13(1) to 13(3). FIG. 13(1) shows signal point arrangements on I-Q phase plane (also referred to as I-Q vector plane or I-Q signal space diagram) when using 8PSK for a modulation system. The 8PSK modulation system transmits a three-bit digital signal (abc) by one symbol. Combinations of bits constituting the symbol include such eight ways as (000), (001), (010), (011), (100), (101), (110), and (111). These three-bit digital signals are converted into signal point arrangements "0" to "7" on transmission-side I-Q phase plane in FIG. 12(1) and this conversion is referred to as 8PSK mapping.

In case of the example shown in FIG. 13(1), bit string (000) is converted into signal point arrangement "0," bit string (001) into signal point arrangement "1," bit string (011) into signal point arrangement "2," bit string (010) into signal point arrangement "3," bit string (100) into signal point arrangement "4," bit string (101) into signal point arrangement "5," bit string (111) into signal point arrangement "6," and bit string (110) into signal point arrangement "7."

FIG. 13(2) shows signal point arrangements on I-Q phase plane at the time of using QPSK for a modulation system. The QPSK modulation system transmits two-bit digital signal (de) by one symbol. Combinations of bits constituting the symbol include such four ways as (00), (01), (10), and (11). In the case of the example in FIG. 13(2), bit string (00) is converted into signal point arrangement "1," bit string (01) into signal point arrangement "3," bit string (11) into signal point arrangement "5," and bit string (10) into signal point arrangement "7."

FIG. 13(3) shows signal point arrangements at the time of using BPSK for a modulation system. The BPSK modulation system transmits one-bit digital signal (f) by one symbol. In case of the digital signal (f), bit (0) is converted into signal point arrangement "0" and bit (1) into signal point arrangement "4." The relation between signal point arrangement and arrangement number is the same for various modulation systems on the basis of 8BPSK.

I-axis and Q-axis of QPSK and BPSK in a hierarchical transmission system coincide with I-axis and Q-axis of 8PSK.

When a phase of a carrier wave before modulated in inputs of the demodulating circuit 1 coincides with phases of reference carrier waves $f_{c1}$ and $f_{c2}$ regenerated by the carrier-wave regenerating circuit 10, a phase of a received-signal point on I-Q phase plane according to reception-side I and Q base-band signals I(8) and Q(8) when receiving digital signals related to signal point arrangements "0" to "7" on I-Q phase plane at the transmission side coincides with that of the transmission side. Therefore, by directly using the relation between signal point arrangement and digital signal at the transmission side (refer to FIG. 13), it is possible to correctly identify a digital signal received from a signal point arrangement of a received-signal point.

However, because the reference carrier waves $f_{c1}$ and $f_{c2}$ can actually take various phase states for a carrier wave before modulated in inputs of the demodulating circuit 1, a received-signal point at the reception side has a phase position rotated by a certain angle θ against the transmission side. Moreover, when a phase of a carrier wave before modulated in inputs of the demodulating circuit 1 fluctuates, e also fluctuates. When a phase of a received-signal point rotates against the transmission side at random, it is impossible to identify a received digital signal. For example, when θ is equal to π/8, a received-signal point of a digital signal (000) of a signal point arrangement "0" according to a transmission-side 8PSK modulation system is brought to the middle between signal point arrangements "0" and "1" at the reception side. Therefore, at the time of assuming that the digital signal (000) is received at the signal point arrangement "0," it is judged that the signal is correctly received. However, at the time of assuming that the signal is received at the signal point arrangement "1," it is erroneously judged that a digital signal (001) is received. Therefore, the carrier-wave regenerating circuit 10 corrects phases of the reference carrier waves $f_{c1}$ and $f_{c2}$ so that a received-signal point keeps a certain rotation angle against the transmission side and a digital signal is correctly identified.

Specifically, the reference carrier wave $f_{c1}$ is generated by making a VCO (voltage control oscillator) 11 of the carrier-wave regenerating circuit 10 oscillate at a transmission-carrier-wave frequency and the reference carrier wave $f_{c2}$ is generated by delaying a phase of an oscillation signal of the VCO 11 by 90° by a 90° phase shifter 12. Moreover, by changing a control voltage of the VCO 11, it is possible to change phases of the reference carrier waves $f_{c1}$ and $f_{c2}$.

The carrier-wave regenerating circuit 10 is provided with phase error tables 13, 14-1 and 14-2, and 15-1 to 15-4 obtained by tabulating relations between various data sets of I and Q base-band signals I(8) and Q(8) and carrier-wave-phase-error data (hereafter also referred to as phase error data) Δϕ(8) of eight quantization bits (two's complement system) and respectively configured by a ROM for each of 8PSK, QPSK, and BPSK modulation systems (refer to FIG. 14). I and Q base-band signals I(8) and Q(8) are input to the phase error tables 13, 14-1 and 14-2, and 15-1 to 15-4 in parallel. A phase error table selectively enabled by a selector to be described later outputs phase error data Δϕ(8) corresponding to I and Q base-band signals I(8) and Q(8) input from the demodulating circuit 1.

The phase error table 13 is used for 8PSK, in which the relation between phase angle ϕ (refer to FIG. 15) and phase error data Δϕ(8) of a received-signal point shown by I and Q base-band signals I(8) and Q(8) in symbols input from the demodulating circuit 1 on I-Q phase plane is constituted as shown in FIG. 17. A selector 16 enables (activates) only the phase error table 13 while the demodulating circuit 1 demodulates digital waves to be modulated according to the BPSK modulation system (designated by a modulation-system identifying signal DM output from a transmission-configuration identifying circuit 9 to be described later) in accordance with a clock $CLK_{SYB}$ (refer to FIG. 11(2)) at a symbol rate synchronous with outputs of I and Q base-band signals I(8) and Q(8) output from the demodulating circuit 1 and reads phase error data Δϕ(8) corresponding to the set data of I and Q base-band signals I(8) and Q(8) whenever the demodulating circuit 1 outputs the I(8) and Q(8) for one symbol.

The phase error data Δϕ(8) is converted into a phase error voltage by a D/A converter 17 and then, low-frequency components of the data are removed by an LPF 18 and the data is applied to the VCO 11 as a control voltage. When the phase error data Δϕ(8) is equal to 0, outputs of the LPF 18 are not changed and therefore, phases of the reference carrier waves $f_{c1}$ and $f_{c2}$ are not changed. However, when the phase error data Δϕ(8) is positive, an output of the LPF 18 is strengthened and phases of the reference carrier waves $f_{c1}$ and $f_{c2}$ are delayed. However, when the phase error data Δϕ(8) is negative, an output of the LPF 18 is weakened and phases of the reference carrier waves $f_{c1}$ and $f_{c2}$ are advanced.

In the phase error table 13, when a modulation system is 8PSK, the difference between a phase angle ϕ of a received-signal point shown by I and Q base-band signals I(8) and Q(8) and a phase of the nearest one (which is a target phase convergent angle of the received-signal point) of signal point arrangements "0" to "7" is equal to phase error data Δϕ(8). In this connection, in FIG. 15, when the received-signal point is included in a certain area $DR_i$ among areas $DR_0$ to $DR_7$ obtained by dividing I-Q phase plane into eight sub-planes so that phases 0, π/4, 2π/4, 3π/4, 4π/4, 5π/4, 6π/4, and 7π/4 of signal point arrangements "0" to "7" respectively become a center, a target phase convergent angle of the received-signal point based on phase correction of the reference carrier waves $f_{c1}$ and $f_{c2}$ becomes equal to i·(π/4).

Therefore, digital signals of signal point arrangements of phases 0, π/4, 2π/4, 3π/4, 4π/4, 5π/4, 6π/4, and 7π/4 according to the 8PSK modulation system at the transmission side respectively converge into a position rotated by Θ=m×π/4 (m is any one of integers 0 to 7; refer to FIG. 16) on I-Q phase plane at the reception side. Symbol Θ denotes a phase rotation angle of a received-signal point against a transmission signal (also in the case of QPSK and BPSK, a received-signal-phase rotation angle is equal to Θ same as the case of 8PSK). Thereby, because a received-signal point according to the 8PSK modulation system is brought to any one of positions of phases 0, π/4, 2π/4, 3π/4, 4π/4, 5π/4, 6π/4, and 7π/4, signal point arrangements "0" to "7" on I-Q phase plane at the reception side have the same arrangements as the transmission side as a whole (however, the relation between individual signal point arrangement and digital signal depends on Θ). By detecting Θ and inversely rotating a phase by −Θ, the relation between signal point arrangement and digital signal can be made same as that of the transmission side (absolute phase generation) and a received digital signal can be easily identified.

The phase error tables 14-1 and 14-2 are used for QPSK, in which the relation between phase angle φ and phase error data Δφ(8) of a received signal point shown by I and Q base-band signals I(8) and Q(8) in symbols on I-Q phase plane is constituted as shown in FIGS. 18 and 19. Under normal reception, the selector 16 enables only the phase error table 14-1 when a received-signal-phase rotation angle Θ is equal to 0, 2π/4, 4π/4, or 6π/4 while the demodulating circuit 1 demodulates digital waves to be modulated according to the QPSK modulation system in accordance with a clock $CLK_{SYB}$ at a symbol rate and reads phase error data Δφ(8) corresponding to the set data of I and Q base-band signals I(8) and Q(8) out of the phase error table 14-1 whenever the demodulating circuit 1 outputs the I(8) and Q(8) for one symbol.

The phase error table 14-1 is used when a modulation system uses QPSK and a received-signal-phase rotation angle Θ is equal to any one of 0, 2π/4, 4π/4, and 6π/4, in which the difference between a phase angle φ of a received-signal point shown by I and Q base-band signals I(8) and Q(8) and a phase of the nearest one (which is a target phase-convergent angle of the received-signal point) of signal point arrangements "1," "3," "5," and "7" is equal to phase error data Δφ. In this connection, as shown in FIG. 20(1), when the received-signal point is included in an area $ER_i$ among areas $ER_0$ to $ER_3$ obtained by dividing I-Q phase plane into four sub-planes so that phases π/4, 3π/4, 5π/4, and 7π/4 of signal points arrangements "1," "3," "5," and "7" respectively become a center, the target phase convergent angle is equal to i·(2π/4)+π/4.

Therefore, digital signals of signal point arrangements "1," "3," "5," and "7" of phases π/4, 3π/4, 5π/4, and 7π/4 according to the QPSK modulation system at the transmission side respectively converge into a position rotated by the above angle Θ on I-Q phase plane at the reception side. When Θ is equal to 0, 2π/4, 4π/4, or 6π/4, a received-signal point according to the QPSK modulation system is brought to any one of positions of phases π/4, 3π/4, 5π/4 and 7π/4. By detecting Θ and inversely rotating a phase by −Θ, the relation between signal point arrangement and digital signal can be made the same as that of the transmission side (absolute phase generation) and a received digital signal can be easily identified.

Moreover, the selector 16 enables only the phase error table 14-2 when Θ is equal to π/4, 3π/4, 5π/4, or 7π/4 while the demodulating circuit 10 demodulates digital waves to be modulated according to the QPSK modulation system and reads phase error data Δφ(8) corresponding to the set data of I and Q base-band signals I(8) and Q(8) out of the phase error table 14-2 whenever the demodulating circuit 1 outputs the I(8) and Q(8) for one symbol.

The phase error table 14-2 is used when a modulation system uses QPSK and a received-signal-phase rotation angle Θ is equal to any one of π/4, 3π/4, 5π/4, and 7π/4, in which the difference between a phase angle φ of a received-signal point shown by I and Q base-band signals I(8) and Q(8) and a phase of the nearest one (which is a target phase convergent angle of the received-signal point) of signal point arrangements "0," "2," "4," and "6" is equal to phase error data Δφ. In this connection, as shown in FIG. 20(2), when the received-signal point is included in an area $FR_i$ among areas $FR_0$ to $FR_3$ obtained by dividing I-Q phase plane into four sub-planes so that phases 0, 2π/4, 4π/4 and 6π/4 of signal point arrangements "0," "2," "4," and "6" respectively become a center, the target phase convergent angle is equal to i·(2π/4).

Therefore, digital signals of signal point arrangements "1," "3," "5," and "7" of phases π/4, 3π/4, 5π/4 and 7π/4 according to the QPSK modulation system at the transmission side respectively converge into a position rotated by the above angle Θ on I-Q phase plane at the reception side. When Θ is equal to π/4, 3π/4, 5π/4, or 7π/4, each received-signal point according to the QPSK modulation system is brought to any one of positions of phases 0, 2π/4, 4π/4, and 6π/4. By detecting Θ and inversely rotating a phase by −Θ, the same phase as that of the transmission side is realized (absolute phase generation), the relation between signal point arrangement and digital signal can be made the same as that of the transmission side, and a received digital signal can be easily identified.

The phase error tables 15-1 to 15-4 are used for BPSK, in which the relation between phase angle φ and phase error data Δφ(8) of a received-signal point shown by I and Q base-band signals I(8) and Q(8) on I-Q phase plane is constituted as shown in FIGS. 21 to 24. The selector 16 enables only the phase error table 15-1 when a received-signal-phase rotation angle Θ due to phase correction of an 8PSK modulation portion is equal to 0 or 4π/4 while the demodulating circuit 1 demodulates digital waves to be modulated according to the BPSK modulation system synchronously with a clock $CLK_{SYB}$ at a symbol rate and reads phase error data Δφ(8) corresponding to the set data of I and Q base-band signals I(8) and Q(8) out of the phase error table 15-1 whenever the demodulating circuit 1 outputs the I(8) and Q(8) for one symbol.

The phase error table 15-1 is used when a modulation system uses BPSK and a received-signal-phase rotation angle Θ is equal to either of 0 and 4π/4, in which the difference between a phase angle φ of a received-signal point shown by I and Q base-band signals I(8) and Q(8) and a phase of the nearest one (which is a target phase convergent angle of the received-signal point) of signal point arrangements "0" and "4" is equal to phase error data Δφ. In this connection, as shown in FIG. 25(1), when the received-signal point is included in the area $GR_i$ of areas $GR_0$ and $GR_1$ obtained by dividing I-Q phase plane into two sub-planes so that phases 0 and 4π/4 of signal point arrangements "0" and "4" respectively become a center, the target phase convergent angle is equal to i·(4π/4).

Therefore, digital signals of signal point arrangements "0" and "4" of phases 0 and 4π/4 according to the BPSK modulation system at the transmission side respectively converge into a position rotated by the above angle Θ on reception-side I-Q phase plane. When Θ is equal to 0 or 4π/4, a received-signal point according to the BPSK modulation system is brought to either of positions of phases 0 and 4π/4.

Moreover, the selector 16 enables only the phase error table 15-2 when Θ is equal to π/4 or 5π/4 while demodulating a digital wave to be modulated according to the BPSK modulation system and reads phase error data Δφ(8) corresponding to I and Q base-band signals I(8) and Q(8) out of the phase error table 15-2 whenever the demodulating circuit 1 outputs the I(8) and Q(8) for one symbol.

The phase error table 15-2 is used when a modulation system uses BPSK and a received-signal-phase rotation angle Θ is equal to either of π/4 and 5π/4, in which the difference between a phase angle φ of a received-signal point shown by I and Q base-band signals I(8) and Q(8) and a phase of the nearest one (which is a target phase convergent angle of the received-signal point) of signal point arrangements "1" and "5" is equal to phase error data Δφ. In this connection, as shown in FIG. 25(2), when the received-signal point is included in the area $HR_1$ of areas $HR_0$ and $HR_1$ obtained by dividing I-Q phase plane into two sub-planes so that phases $\pi/4$ and $7\pi/4$ of signal point arrangements "1" and "5" respectively become a center, the target phase convergent angle is equal to $i \cdot (4\pi/4) + \pi/4$.

Thus, digital signals of signal point arrangements "0" and "4" of phases 0 and $4\pi/4$ according to the BPSK modulation system at the transmission side respectively converge into a position rotated by the above angle $\Theta$ on I-Q phase plane at the reception side. When $\Theta$ is equal to $\pi/4$ or $5\pi/4$, a received-signal point according to the BPSK modulation system is brought to either of positions of phases $\pi/4$ and $5\pi/4$.

Moreover, the selector 16 enables only the phase error table 15-3 when $\Theta$ is equal to $2\pi/4$ or $6\pi/4$ while demodulating a digital wave to be modulated according to the BPSK modulation system and reads phase error data $\Delta\phi(8)$ corresponding to the set data of I and Q base-band signals I(8) and Q(8) out of the phase error table 15-3 whenever the demodulating circuit 1 outputs the I(8) and Q(8) for one symbol.

The phase error table 15-3 is used when a modulation system uses BPSK and a received-signal-phase rotation angle $\Theta$ is equal to either of $2\pi/4$ and $6\pi/4$, in which the difference between a phase angle $\phi$ of a received-signal point shown by I and Q base-band signals I(8) and Q(8) and a phase of the nearest one (which is a target phase convergent angle of the received-signal point) of signal point arrangements "2" and "6" is equal to phase error data $\Delta\phi$. In this connection, as shown in FIG. 25(3), when the received-signal point is included in the area $IR_i$ of areas $IR_0$ and $IR_1$ obtained by dividing I-Q phase plane into two sub-planes so that phases $2\pi/4$ and $6\pi/4$ of signal point arrangements "2" and "6" respectively become a center, the target phase convergent angle is equal to $i \cdot (4\pi/4) + 2\pi/4$.

Therefore, digital signals of signal point arrangements "0" and "4" of phases 0 and $4\pi/4$ according to the BPSK modulation system at the transmission side respectively converge into a position rotated by the above angle $\Theta$ on reception-side I-Q phase plane. When $\Theta$ is equal to $2\pi/4$ or $6\pi/4$, a received-signal point according to the BPSK modulation system is brought to either of positions of phases $2\pi/4$ and $6\pi/4$.

Moreover, the selector 16 enables only the phase error table 15-4 when $\Theta$ is equal to $3\pi/4$ or $7\pi/4$ while demodulating a digital wave to be modulated according to the BPSK modulation system and reads phase error data $\Delta\phi(8)$ corresponding to the set data of I and Q base-band signals I(8) and Q(8) out of the phase error table 15-4 whenever the demodulating circuit 1 outputs the I(8) and Q(8) for one symbol.

The phase error table 15-4 is used when a modulation system uses BPSK and a received-signal-phase rotation angle $\Theta$ is equal to either of $3\pi/4$ and $7\pi/4$, in which the difference between a phase angle $\phi$ of a received-signal point shown by I and Q base-band signals I(8) and Q(8) and a phase of the nearest one (which is a target phase convergent angle of the received-signal point) of signal point arrangements "3" and "7" is equal to phase error data $\Delta\phi$. In this connection, as shown in FIG. 25(4), when the received-signal point is included in an area $JR_i$ of areas $JR_0$ and $JR_1$ obtained by dividing I-Q phase plane into two sub-planes so that phases $3\pi/4$ and $7\pi/4$ of signal point arrangements "3" and "7" respectively become a center, the target phase convergent angle is equal to $i \cdot (4\pi/4) + 3\pi/4$.

Thus, digital signals of signal point arrangements "0" and "4" of phases 0 and $4\pi/4$ according to the BPSK modulation system at the transmission side respectively converge into a position rotated by the above angle $\Theta$ on reception-side I-Q phase plane. When $\Theta$ is equal to $3\pi/4$ or $7\pi/4$, the received-signal point according to the BPSK modulation system is brought to either of positions of phases $3\pi/4$ and $7\pi/4$. Also in the case of BPSK modulation, by detecting $\Theta$ and inversely rotating a phase by $-\Theta$, a phase same as that of the transmission side can be realized (absolute phase generation), the relation between a signal point arrangement and a digital signal can be made the same as that of the transmission side, and a received digital signal can be easily identified.

Moreover, as shown in FIG. 26, a frame-sync detecting/regenerating circuit 2 is configured by a BPSK demapper section 3, sync detecting circuits 40 to 47, a frame-synchronizing circuit 5, an OR gate circuit 53, and a frame-synchronizing-signal generator 6. As shown in FIG. 12, a received-signal-phase-rotation-angle detecting circuit 8 is configured by delay circuits 81 and 82, a 0°/180° phase rotating circuit 83, averaging circuits 84 and 85, and a received-phase judging circuit 86.

I and Q base-band signals I(8) and Q(8) output from the demodulating circuit 1 are input to the BPSK demapper section 3 of the frame-sync detecting/regenerating circuit 2 in order to acquire, for example, a BPSK-modulated frame-synchronizing signal and a BPSK-demapped bit stream B0 is output. The BPSK demapper section 3 is configured by, for example, a ROM.

Then, a frame-synchronizing signal will be described. In case of the hierarchical transmission system, a frame-synchronizing signal is transmitted by being BPSK-modulated so that a necessary C/N is minimized. A frame-synchronizing signal configured by 20 bits has a bit stream of (S0S1 . . . S18S19)=(11101100110100101000) which are transmitted in order starting with S0. Hereafter, a bit stream of a frame-synchronizing signal is also referred to as "SYNCPAT." The bit stream is converted into a signal point arrangement "0" or "4" through the BPSK mapping shown in FIG. 13(3) at the transmission side and a converted symbol stream is transmitted.

To acquire a frame-synchronizing signal of 20 bits to be BPSK-modulated and transmitted, that is, 20 symbols, it is necessary to convert received symbols into bits through the BPSK demapping shown in FIG. 27(1) inversely to the mapping to be converted at the transmission side. Therefore, as shown in FIG. 27(1), (0) is judged when a demodulated signal is received in a hatched area on reception-side I-Q phase plane and (1) is judged when the signal is received in a not-hatched area. That is, in FIG. 27(1), an output is classified into (0) or (1) depending on a judgement area in which the output is received out of two judgement areas divided by a BPSK judgement border line shown by a bold line in FIG. 27(1) and thereby, it is assumed that BPSK demapping is performed.

I and Q base-band signals I(8) and Q(8) are input to the BPSK demapper section 3 for performing BPSK demapping and the bit stream B0 BPSK-demapped in the BPSK demapper section 3 is output. In this specification, a demapper denotes a circuit for performing demapping. The bit stream B0 is input to the sync detecting circuit 40 in which a bit stream of a frame-synchronizing signal is acquired from the bit stream B0.

Then, the sync detecting circuit 40 is described by referring to FIG. 28. The sync detecting circuit 40 has 20 D-flip-flops (hereafter referred to as D-F/Fs) D19 to D0 connected in series and a 20-stage shift register is constituted by these D-F/Fs D19 to D0. The bit stream B0 is input to the D-F/F D19 and successively shifted up to the D-F/F D0. At the same time, predetermined logical inversion is applied to predetermined bits of outputs of the D-F/Fs D19 to D0 and then, the outputs are input to an AND gate 51. When output states (D0D1 . . . D18D19) of the D-F/Fs D19 to D0 become (1110110011010010100), an output SYNA0 of the AND gate 51 becomes a high potential. That is, when SYNCPAT is acquired, the SYNA0 becomes a high potential.

The output SYNA0 of the sync detecting circuit 40 is input to a frame-synchronizing circuit 5 through an OR gate circuit 53. In the frame-synchronizing circuit 5, when it is confirmed that an output SYNA of the OR gate circuit 53 repeatedly becomes a high potential every certain frame cycle, it is discriminated that a frame sync is established and a frame-synchronizing pulse is output every frame cycle.

In the case of a hierarchical transmission system to which a plurality of modulation systems having necessary C/Ns different from each other are time-multiplexed and repeatedly transmitted with frame, header data showing their multiple configuration is multiplexed (TMCC pattern in FIG. 11(1)). The transmission-configuration identifying circuit 9 extracts TMCC showing a multiple configuration from a bit stream after a BPSK demapper input from the frame-synchronizing circuit 5 after it is discriminated that frame sync is established in the frame-sync detecting/regenerating circuit 2, decodes the TMCC, and outputs a modulation-system identifying signal DM showing to which modulation system the present I and Q base-band signals I and Q conform to the selector 16 and the like (refer to FIG. 11(2)).

Moreover, the received-signal-phase-rotation-angle detecting circuit 8 detects a received-signal-phase rotation angle $\Theta$ in accordance with a regenerated frame-synchronizing signal output from the frame-synchronizing-signal generator 6 after it is discriminated that frame sync is established in the frame-sync detecting/regenerating circuit 2 and outputs a three-bit received-signal-phase-rotation-angle signal AR(3) to the remapper 7 and the selector 16 of the carrier-wave regenerating circuit 10.

After a modulation-system identifying signal DM is input from the transmission-configuration identifying circuit 9 and a received-signal-phase-rotation-angle signal AR(3) is input from the received-signal-phase-rotation-angle detecting circuit 8, the selector 16 of the carrier-wave regenerating circuit 10 reads phase error data $\Delta\phi(8)$ out of a phase error table corresponding to a modulation system and a received-signal-phase rotation angle $\Theta$ and outputs the data $\Delta\phi(8)$ to the D/A converter 17. However, before outputting the data, the selector 16 reads phase error data $\Delta\phi(8)$ out of the phase error table 13 for 8PSK.

Therefore, the demodulating circuit 1 always operates as an 8PSK demodulating circuit before the transmission-configuration identifying circuit 9 identifies a multiple configuration and the received-signal-phase-rotation-angle detecting circuit 8 detects a received-signal-phase rotation angle $\Theta$. Thus, a phase of a received-signal point rotates against the transmission side by $\Theta=m\times\pi/4$ (m is one of integers 0 to 7) depending on phase states of the reference carrier waves $f_{c1}$ and $f_{c2}$ regenerated by the carrier-wave regenerating circuit 10 of the demodulating circuit 1.

That is, as shown in FIG. 13(3), a demodulated frame-synchronizing signal has the following eight phase states depending on a phase state of the reference carrier wave $f_{c1}$ or $f_{c2}$: a case in which a received-signal point of a symbol stream of a frame-synchronizing signal BPSK-mapped to signal point arrangement "0" for bit (0) or to signal point arrangement "4" for bit (1) at the transmission side appears on signal point arrangement "0" or "4" similarly to the case of the transmission side, a case in which the received-signal point appears on signal point arrangement "1" or "5" phase-rotated by $\Theta=\pi/4$, a case in which the received-signal point appears on signal point arrangement "2" or "6" phase-rotated by $\Theta=2\pi/4$, a case in which the received-signal point appears on signal point arrangement "3" or "7" phase-rotated by $\Theta=3\pi/4$, a case in which the received-signal point appears on signal point arrangement "4" or "0" phase-rotated by $\Theta=4\pi/4$, a case in which the received-signal point appears on signal point arrangement "5" or "1" phase-rotated by $\Theta=5\pi/4$, a case in which the received-signal point appears on signal point arrangement "6" or "2" phase-rotated by $\Theta=6\pi/4$, and a case in which the received-signal point appears on signal point arrangement "7" or "3" phase-rotated by $\Theta=7\pi/4$. Therefore, it must be possible to acquire a frame-synchronizing signal demodulated in any phase.

Therefore, as shown in FIG. 29, the BPSK demapper section 3 is configured by BPSK demappers 30 to 37 corresponding to phase rotations of $\Theta=0$ (m=0), $\Theta=\pi/4$ (m=1), $\Theta=2\pi/4$ (m=2), . . . , $\Theta=6\pi/4$ (m=6), and $\Theta=7\pi/4$ (m=7).

FIG. 27(2) shows BPSK demapping for a case in which a phase of a symbol stream of a demodulated frame-synchronizing signal rotates by $\Theta=\pi/4$, and bit (0) appears on signal point arrangement "1" and bit (1) appears on signal point arrangement "5." A BPSK judgement border line shown by a bold line in FIG. 27(2) rotates by $\pi/4$ counterclockwise from the BPSK judgement border line shown by a bold line for BPSK demapping in FIG. 27(1) in the case of reception at the same phase as the transmission side. By using a BPSK demapper (refer to symbol 31 in FIG. 29) for performing the BPSK demapping shown in FIG. 27(2), it is possible to stably acquire a frame-synchronizing signal phase-rotated by $\Theta=\pi/4$. A bit stream BPSK-demapped by the BPSK demapper 31 serves as an output B1 of the BPSK demapper section 3 in FIG. 26.

Similarly, BPSK demappers 32 to 37 perform BPSK demapping at BPSK judgement border lines rotated by $2\pi/4$, $3\pi/4$, . . . , and $7\pi/4$ counterclockwise from the BPSK judgement border line shown by a bold line for the BPSK demapping in FIG. 27(1) to stably acquire frame-synchronizing signals phase-rotated by $\Theta=2\pi/4, 3\pi/4, \ldots,$ and $7\pi/4$. Bit streams BPSK-demapped by the BPSK demappers 32 to 37 serve as outputs B2 to B7 of the BPSK demapper section 3 in FIG. 26. The BPSK demapper 30 performs BPSK demapping at the BPSK judgement border line shown by a bold line for the BPSK demapping in FIG. 27(1) to stably acquire a frame-synchronizing signal of $\Theta=0$. A bit stream BPSK-demapped by the BPSK demapper 30 serves as an output B0 of the BPSK demapper section 3 in FIG. 26.

Configurations of sync detecting circuits 41 to 47 are the same as the configuration of the sync detecting circuit 40. By using these sync detecting circuits 40 to 47, a frame-synchronizing signal is acquired by one of the sync detecting circuits 40 to 47 independently of phase rotation of a base-band signal according to a phase state of the reference carrier wave $f_{c1}$ or $f_{c2}$ regenerated by the carrier-wave regenerating circuit 10 of the demodulating circuit 1 and a high-potential SYNAn (n is one of integers 0 to 7) is transmitted from the sync detecting circuit acquiring the frame-synchronizing signal.

The SYNAn output from one of the sync detecting circuits 40 to 47 is input to the OR gate circuit 53 and a logical sum SYNA of the SYNAn is output from the OR gate circuit 53. The frame-synchronizing circuit 5 judges that frame sync is established when it is confirmed that a high potential of SYNA is alternately repeatedly input every certain frame interval and outputs a frame-synchronizing pulse FSYNC every frame cycle. The frame-synchronizing-signal generator 6 generates a bit stream same as a pattern SYNCPAT of a frame-synchronizing signal acquired by the BPSK demapper 3, sync detecting circuits 40 to 47, and frame-synchronizing circuit 5 (the bit stream is referred to as a regenerated frame-synchronizing signal) in accordance with the frame-synchronizing pulse FSYNC output by the frame-synchronizing circuit 5.

The process is described above in which a frame-synchronizing signal is acquired from I and Q symbol-stream data I(8) and Q(8) output from the demodulating circuit 1 by the frame-sync detecting/regenerating circuit 2 shown in FIG. 26 and a regenerated frame-synchronizing signal is output from the frame-synchronizing-signal generator 6 after a certain time elapses.

Then, the transmission-configuration identifying operation by the transmission-configuration identifying circuit 9 is described below. The transmission-configuration identifying circuit 9 inputs bit streams B0 to B7 output by the BPSK demapper 3 of the frame-sync detecting/regenerating circuit 2, SYNA0 to SYNA7 output by sync detecting circuits 40 to 47, and a frame-synchronizing pulse FSYNC output by the frame-synchronizing circuit 5. Moreover, when the circuit 9 inputs the frame-synchronizing pulse FSYNC, it captures a bit stream Bn of a system repeatedly becoming a high potential in SYNA0 to SYNA7, extracts and decodes the TMCC pattern in FIG. 11(1) by using a predetermined timing signal generated in accordance with the frame-synchronizing pulse FSYNC, and outputs a modulation-system identifying signal DM showing on which modulation system the present I and Q base-band signals I and Q depend (refer to FIG. 11(2)).

Then, absolute phase generation is described below which is realized by obtaining the present received-signal-phase rotation angle from a signal point arrangement of an acquired frame-synchronizing signal and inversely rotating the phase of demodulated I and Q base-band signals I(8) and Q(8) in accordance with the obtained received-signal-phase rotation angle.

Each symbol of a symbol stream of a frame-synchronizing signal which is BPSK-mapped at the transmission side, transmitted, and demodulated to I and Q base-band signals I(8) and Q(8) by the demodulating circuit 1 is demapped to bit (0) or (1) by the BPSK demapper section 3 and the difference between phases of a symbol demapped to bit (0) and a symbol demapped to bit (1) is equal to 180°.

Therefore, by rotating the phase of the symbol demapped to bit (1) at the frame-synchronizing-signal portion of a received symbol stream by 180°, symbol streams which are all demapped to bit (0) are obtained.

Moreover, by obtaining the average value of a plurality of symbols of the symbol streams which are all demapped to bit (0), a received-signal-point arrangement for bit (0) of BPSK is obtained. Therefore, by obtaining the phase difference between the obtained received-signal point for bit (0) of BPSK and the signal point arrangement "0" mapped to bit (0) at the transmission side, assuming the phase difference as a received-signal-phase rotation angle Θ, and applying phase rotation of η=−Θ to the whole demodulated I and Q base-band signals, it is possible to generate absolute phases of I and Q base-band signals I(8) and Q(8).

As described above, by receiving a frame-synchronizing pulse output from the frame-synchronizing circuit 5, the frame-synchronizing-signal generator 6 generates a bit stream same as the pattern SYNCPAT of an acquired frame-synchronizing signal and supplies the bit stream to the 0°/180° phase-rotating circuit 83 of the received-signal-phase-rotation-angle detecting circuit 8 as a regenerated frame-synchronizing signal. The 0°/180° phase-rotating circuit 83 rotates the phase of I and Q base-band signals by 180° for bit (1) of a bit stream of a supplied regenerated frame-synchronizing signal but the circuit 83 does not rotate the phase of I and Q base-band signals for bit (0) of the bit stream in accordance with a bit (0) or (1) of a bit stream of a supplied regenerated frame-synchronizing signal.

The timing of a bit stream of a regenerated frame-synchronizing signal transmitted from the frame-synchronizing-signal generator 6 is made to coincide with the timing of a symbol stream of a frame-synchronizing signal in I and Q symbol streams by the delay circuits 81 and 82 at the input side of the 0°/180° phase-rotating circuit 83. The delay circuits 81 and 82 respectively open their output gate only while a frame-synchronizing-signal-interval signal is output from the frame-synchronizing-signal generator 6. Therefore, I and Q symbol streams DI(8) and DQ(8) of a frame-synchronizing-signal portion are output from the delay circuits 81 and 82. In case of the I and Q symbol streams DI(8) and DQ(8), a symbol portion corresponding to bit (1) of a bit stream of a regenerated frame-synchronizing signal is phase-rotated by 180° by the 0°/180° phase-rotating circuit 83 but a symbol portion corresponding to bit (0) is transmitted to the averaging circuits 84 and 85 as symbol streams VI(8) and VQ(8) without being phase-rotated. Because all of 20 bits of the symbol streams VI(8) and VQ(8) constituting a frame-synchronizing signal are equal to bit (0), the symbol streams VI(8) and VQ(8) serve as symbol streams when receiving a signal BPSK-mapped at the transmission side.

FIG. 30(1) shows the signal point arrangement of I and Q symbol streams I(8) and Q(8) of a frame-synchronizing signal when received at a received-signal-phase rotation angle Θ=0 and FIG. 30(2) shows the signal point arrangement of I and Q symbol streams VI(8) and VQ(8) after converted by the 0°/180° phase-rotating circuit 83. I and Q symbol streams VI(8) and VQ(8) are transmitted to the averaging circuits 84 and 85 and their quantization bit lengths are respectively converted into 16 to 18 bits and then, quantization bit lengths for four frames(for 16×4=64 symbols) are averaged, and the averaged value is output as AVI(8) and AVQ(8) according to the original quantization bit length of 8 bits. In this case, I and Q symbol streams VI(8) and VQ(8) are averaged in order to stably obtain a signal point arrangement even if a slight phase change or amplitude fluctuation occurs in a received base-band signal due to deterioration of a received C/N occurs.

A received-signal point [AVI(8), AVQ(8)] of a signal obtained by BPSK-mapping bit (0) by the averaging circuits 84 and 85 is obtained. Then, the received-signal point [AVI(8), AVQ(8)] is input to the received-phase judging circuit 86 comprising a ROM and a received-signal-phase rotation angle Θ is obtained in accordance with a received-signal-phase-rotation-angle judging table on the AVI-AVQ phase plane shown in FIG. 31 and a phase-rotation-angle signal AR(3) of three bits (natural binary number) corresponding to the Θ is output. R=0–7 in FIG. 31 shows a decimal notation of the phase-rotation-angle signal AR(3). For example, a received-signal-phase rotation angle obtained by judging a signal point of the point Z=[AVI(8), AVQ(8)] shown in FIG. 30 in accordance with a received-signal-phase-rotation-angle judging table is equal to Θ=0. Therefore, R becomes equal to 0 and (000) is transmitted as the received-signal-phase-rotation-angle signal AR(3). When the received-signal-phase rotation angle Θ is equal to π/4, R=1 is obtained and (001) is transmitted as the received-signal-phase-rotation-angle signal AR(3).

Because the remapper 7 comprising a ROM receives the received-signal-phase-rotation-angle signal AR(3) to rotate the phase of I and Q base-band signals I(8) and Q(8) in accordance with the received-signal-phase-rotation-angle signal AR(3), an absolute phase is generated.

Functions of the remapper 7 are described below. The remapper 7 constitutes a phase converting circuit for making the signal point arrangement of received I and Q base-band signals I(8) and Q(8) same as that of the transmission side. A received-signal-phase rotation angle Θ is calculated by the received-signal-phase-rotation-angle detecting circuit 8 and a received-signal-phase-rotation-angle signal AR(3) corresponding to the received-signal-phase rotation angle Θ is supplied to the remapper 7. In this case, the decimal notation R of the received-signal-phase-rotation-angle signal AR(3) is one of integers 0 to 7 and the relation with the received-signal-phase rotation angle Θ is defined as shown by the following expression (1).

$$R=\Theta/(\pi/4) \tag{1}$$

In the above expression, Θ is equal to m·(π/4) and m is one of integers 0 to 7.

Absolute phase generation for I and Q base-band signals is realized by applying inverse rotation, that is, phase rotation of −Θ to a received-signal-phase rotation angle Θ. Therefore, the remapper 7 phase-rotates input I and Q base-band signals I and Q by an angle η (=−Θ) in accordance with the following expressions (2) and (3) and outputs absolute-phase-generated I and Q base-band signals I'(8) and Q'(8) (hereafter referred to as I' and Q' by omitting the number of quantization bits).

$$I'=I\cos(\eta)-Q\sin(\eta) \tag{2}$$

$$Q'=I\sin(\eta)-Q\cos(\eta) \tag{3}$$

Moreover, it is permitted that a frame-synchronizing signal is acquired by the frame-sync detecting/regenerating circuit 2 and a frame-synchronizing pulse is output and thereafter, the transmission-configuration identifying circuit 9 previously identifies a transmission configuration and then the received-signal-phase-rotation-angle detecting circuit 8 detects a received-signal-phase rotation angle or the received-signal-phase-rotation-angle detecting circuit 8 previously detects the received-signal-phase-rotation-angle and then the transmission-configuration identifying circuit 9 identifies the transmission configuration. Moreover, it is possible to simultaneously perform the detection of a received-signal-phase rotation angle by the received-signal-phase-rotation-angle detecting circuit 8 and the identification of a transmission configuration by the transmission-configuration identifying circuit 9.

In case of the above-described conventional receiver, however, it is necessary to prepare such seven phase error tables as the phase error table 13 for correcting the phase of the reference carrier waves $f_{c1}$ and $f_{c2}$ for demodulation according to the 8PSK modulation system, phase error tables 14-1 and 14-2 for correcting the phase of the reference carrier waves $f_{c1}$ and $f_{c2}$ for demodulation according to the QPSK modulation system, and phase error tables 15-1 to 15-4 for correcting the phase of the reference carrier waves $f_{c1}$ and $f_{c2}$ for demodulation according to the BPSK modulation system. Therefore, there is a problem that a necessary memory capacity increases.

It is an object of the present invention to provide a receiver requiring only a small circuit size.

DISCLOSURE OF THE INVENTION

A receiver of the present invention comprises demodulating means for demodulating a signal to be PSK-modulated in which digital signals modulated by 2-phase, 4-phase, and 8-phase PSK modulation systems are time-multiplexed by using a carrier wave regenerated by carrier-wave regenerating means and outputting I and Q symbol-stream data in symbols; received-signal-phase-rotation-angle detecting means for detecting a phase rotation angle Θ of I and Q symbol-stream data against the transmission side for each symbol output from the demodulating means, inversely-phase-rotating means for rotating the phase of I and Q symbol-stream data for each symbol output from the demodulating means by −Θ against the phase rotation angle Θ detected by the received-signal-phase-rotation-angle detecting means, generating the absolute phase of the phase of the I and Q symbol-stream data, and outputting the absolute phase; and modulation-system identifying means for identifying a modulation system currently demodulated by the demodulating means; wherein the inversely-phase-rotating means rotates the phase of the I and Q symbol-stream data for each symbol output from the demodulating means by two types of phase rotation angles through time sharing and outputs the data and one of the two types is assumed to be equal to the above angle −Θ and the carrier-wave regenerating means is provided with a phase error table storing carrier-wave-phase-error data for various I and Q symbol-stream data sets after absolute phase generation by the 2-phase PSK modulation system and phase-error detecting means for detecting a phase error of a regenerated carrier wave by obtaining a shift angle Θ' of a received-signal point shown by an I and Q symbol-stream-data set for each symbol after absolute phase generation viewed in the positive direction or negative direction of I-axis included in the phase error table up to a target phase convergent angle according to a modulation system identified by the modulation-system identifying means and reading carrier-wave-phase-error data corresponding to an I and Q symbol-stream data set when phase-rotating the other one of the two types to be phase-rotated by inversely-phase-rotating means by −(Θ+Θ') through time sharing out of a phase error table so as to correct a phase of a regenerated carrier wave in accordance with carrier-wave-phase-error data detected by the phase-error detecting means.

Inversely-phase-rotating means outputs I and Q symbol-stream data absolute-phase-generated by phase-rotating I and Q symbol-stream data for each symbol output from demodulating means by −Θ and moreover, outputs I and Q symbol-stream data phase-rotated by −(Θ+Θ') through time sharing when assuming a shift angle up to a target phase convergent point of a received-signal point shown by an absolute-phase-generated I and Q symbol-stream data set viewed in the positive or negative direction of I-axis included in a phase error table in accordance with a modulation system identified by modulation-system identifying means as Θ'. Phase-error detecting means reads phase error data out of a phase error table by using the I and Q symbol-stream data set. Because the phase error data is data corresponding to a modulation system of a received signal currently demodulated by demodulating means, a receivedsignal-phase rotation angle against the transmission side, and a received-signal point, carrier-wave regenerating means requires only one phase error table. Therefore, it is possible to decrease the number of phase error tables to be provided for carrier-wave regenerating means and greatly simplify a circuit configuration.

BRIEF DESCRIPTION OF THE DRAWINGS

FIGS. 9(1) and 9(2) are illustrations showing operations of the phase-error detecting circuit;

FIGS. 20(1) and 20(2) are illustrations for explaining relations between phase angles and target phase convergent angles of received-signal points for QPSK;

FIGS. 27(1) and 27(2) are illustrations for explaining BPSK demapping;

FIGS. 30(1) and 30(2) are signal point arrangement diagrams of a frame-synchronizing signal before and after passing through the 0°/180° phase rotating circuit in FIG. 12.

BEST MODE FOR CARRYING OUT THE INVENTION

Then, an embodiment of the present invention will be described below by referring to FIG. 1.

Figure 1:
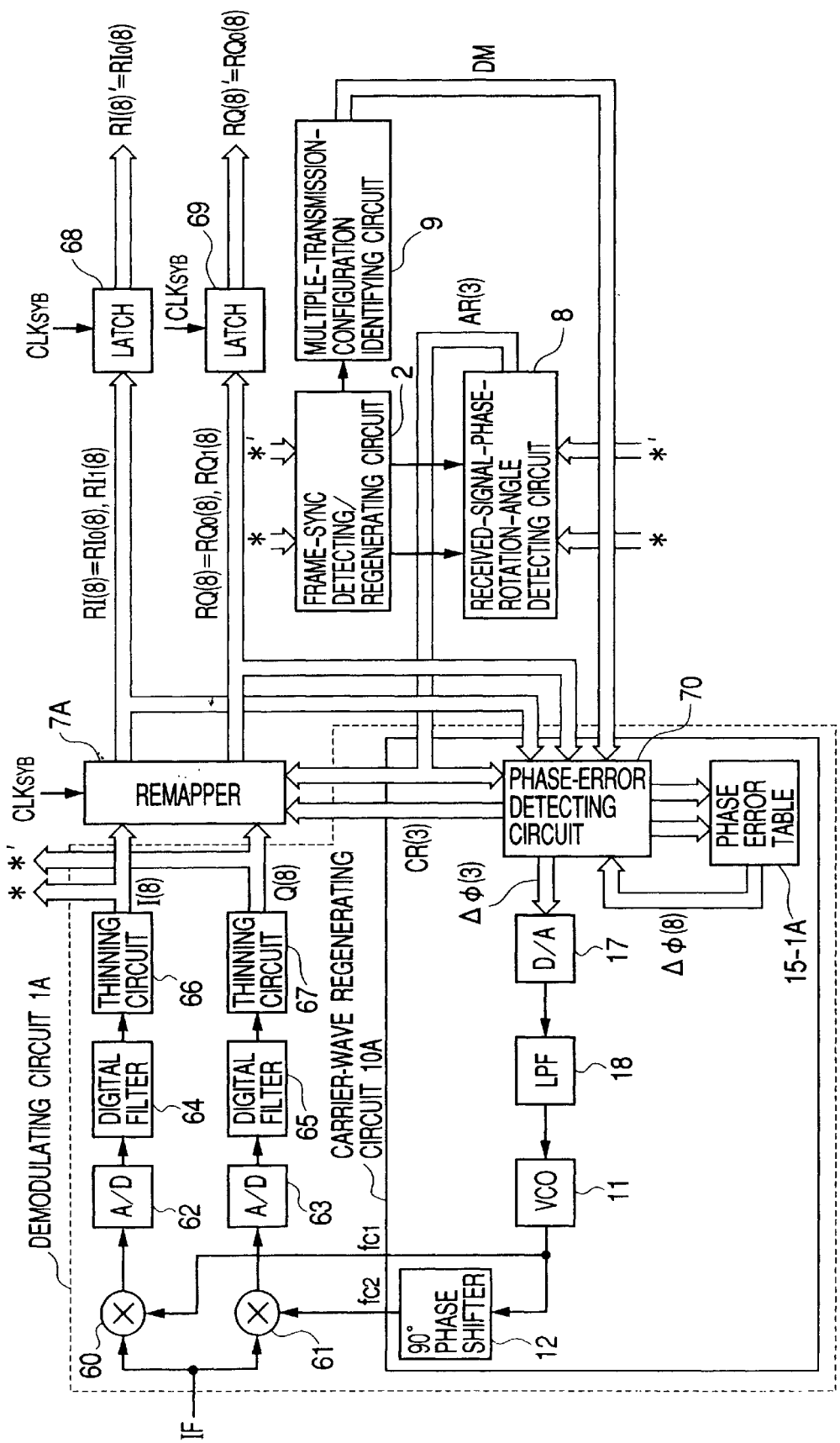
FIG. 1 is a block diagram showing a configuration of an essential portion of a wave-to-be-PSK-modulated receiver of an embodiment of the present invention.
Figure 12:
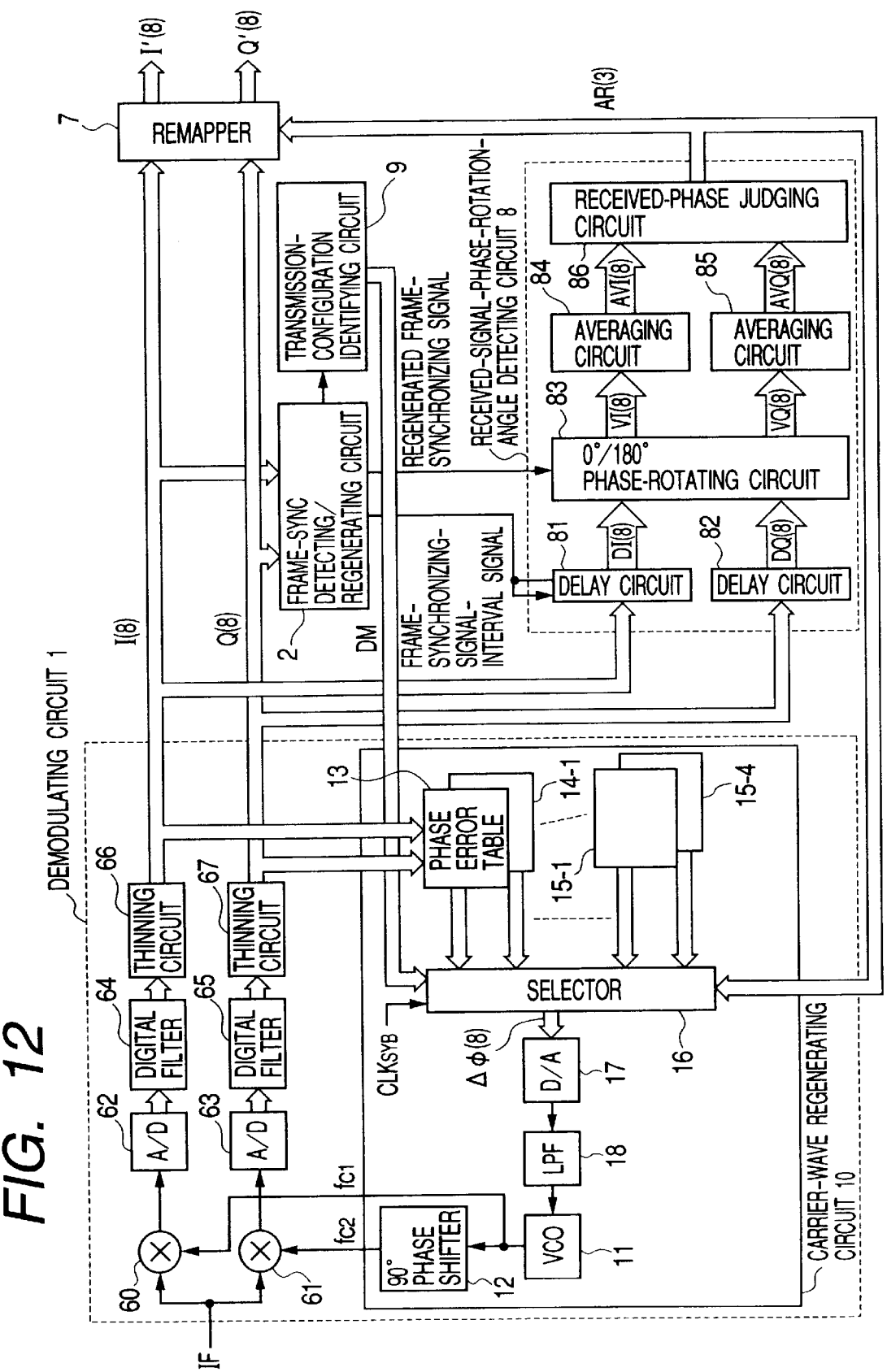
FIG. 12 is a block diagram showing a configuration around a demodulating circuit of a wave-to-be-PSK-modulated receiver according to a conventional hierarchical transmission system.
Figure 13:
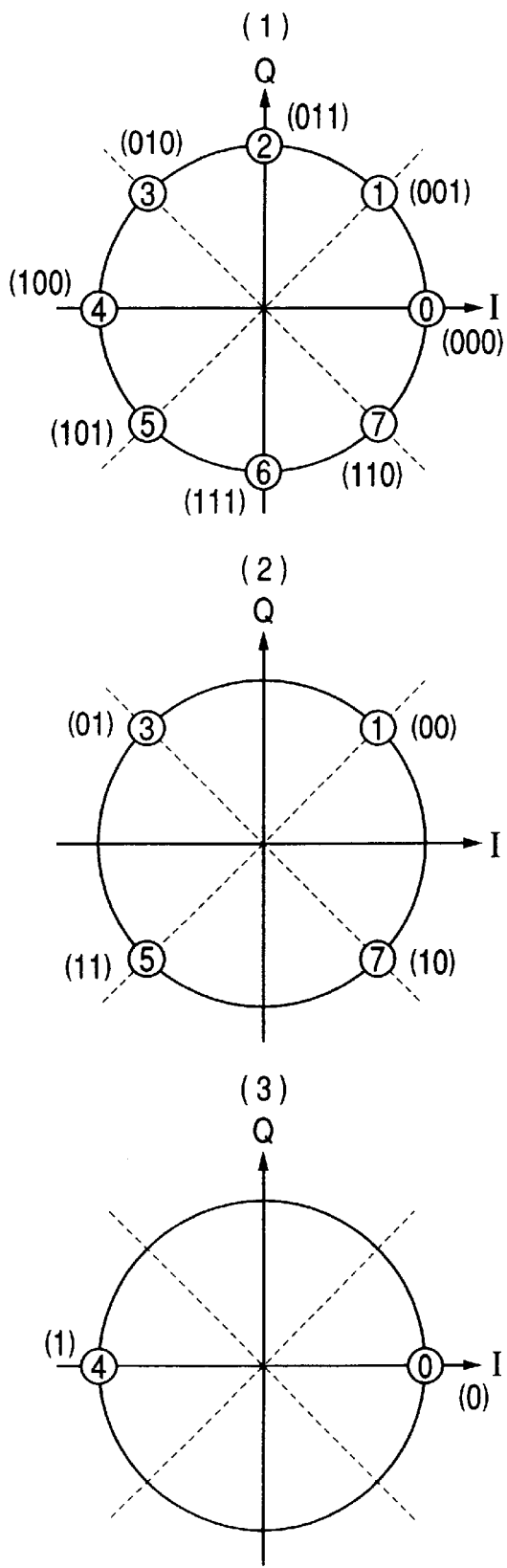
FIGS. 13(1) to 13(3) are illustrations showing signal point arrangements for PSK mapping.
Figure 14:
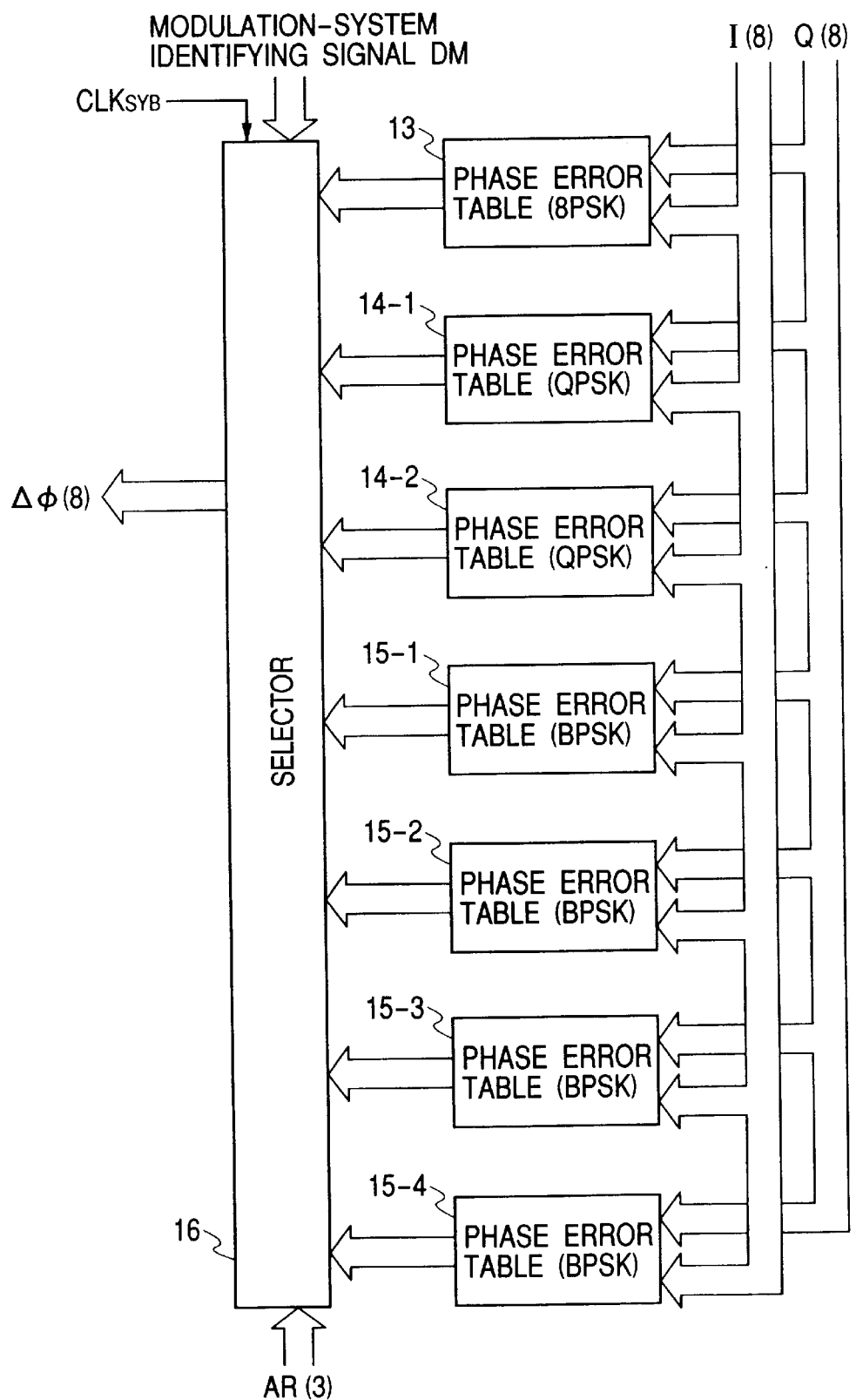
FIG. 14 is a block diagram of a carrier-wave regenerating circuit in FIG. 12 locally omitted.
Figure 15:
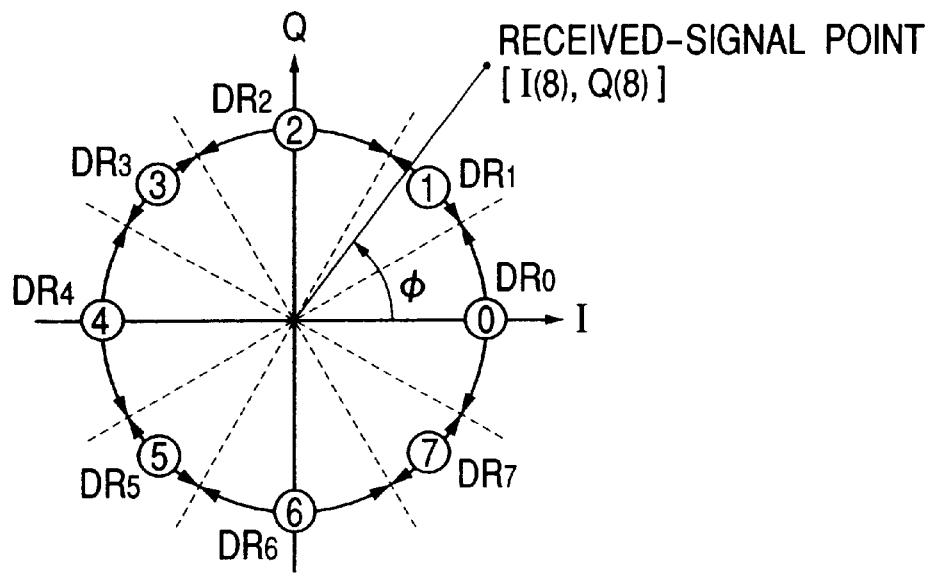
FIG. 15 is an illustration showing how to measure a phase of a received-signal, point.
Figure 16:
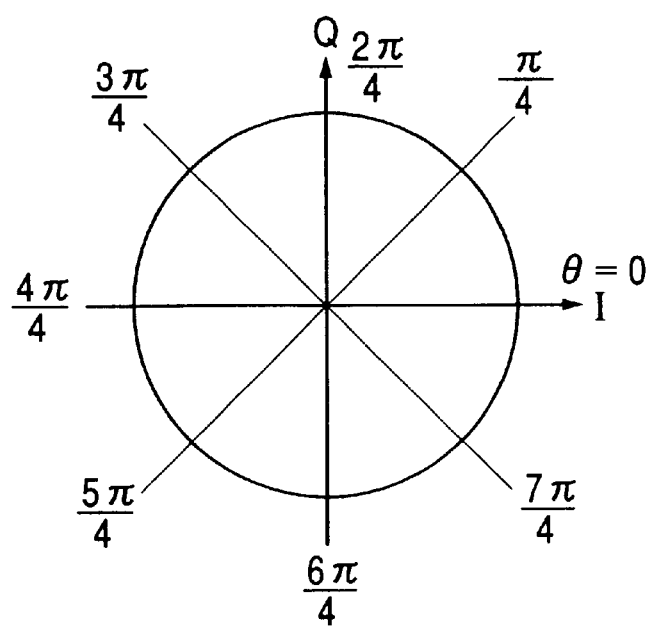
FIG. 16 is an illustration showing how to measure a received-signal-phase rotation angle.

FIG. 1 is a block diagram of an essential portion of a broadcast receiver (wave-to-be-PSK-modulated receiver) of the present invention, in which a component same as that in FIG. 12 is provided with the same symbol.

In FIG. 12, the carrier-wave regenerating circuit has seven phase error tables 13, 14-1 and 14-2, and 15-1 to 15-4 and reads phase error data corresponding to a set of I and Q symbol-stream data I(8) and Q(8) output from the demodulating circuit. In FIG. 1, however, the carrier-wave regenerating circuit has only the phase error table 15-1A and reads phase error data corresponding to an I and Q symbol-stream data set absolute-phase-generated by a remapper 7A.

The remapper 7A generates the absolute phase of I and Q symbol-stream data I(8) and Q(8) for each symbol output from the demodulating circuit 1A by phase-rotating the data by $-\Theta$ in accordance with a received-signal-phase rotation angle $\Theta$ detected by the received-signal-phase-rotation-angle detecting circuit 8 through time sharing and outputs the data as I and Q symbol-stream data $RI(8)=RI_0(8)$ and $RQ(8)=RQ_0(8)$ or outputs the I and Q symbol-stream data I(8) and Q(8) as I and Q symbol-stream data $RI(8)=RI_1(8)$ and $RQ(8)=RQ_1(8)$ by assuming a shift angle up to a target phase convergent angle of a received-signal point shown by I and Q symbol-stream data for each symbol after absolute-phase-generated by the remapper 7A viewed in the positive direction of I-axis for each modulation system in accordance with an output of a phase-error detecting circuit to be described later as $\Theta'$ and phase-rotating the data by $-(\Theta+\Theta')$.

Figure 8:
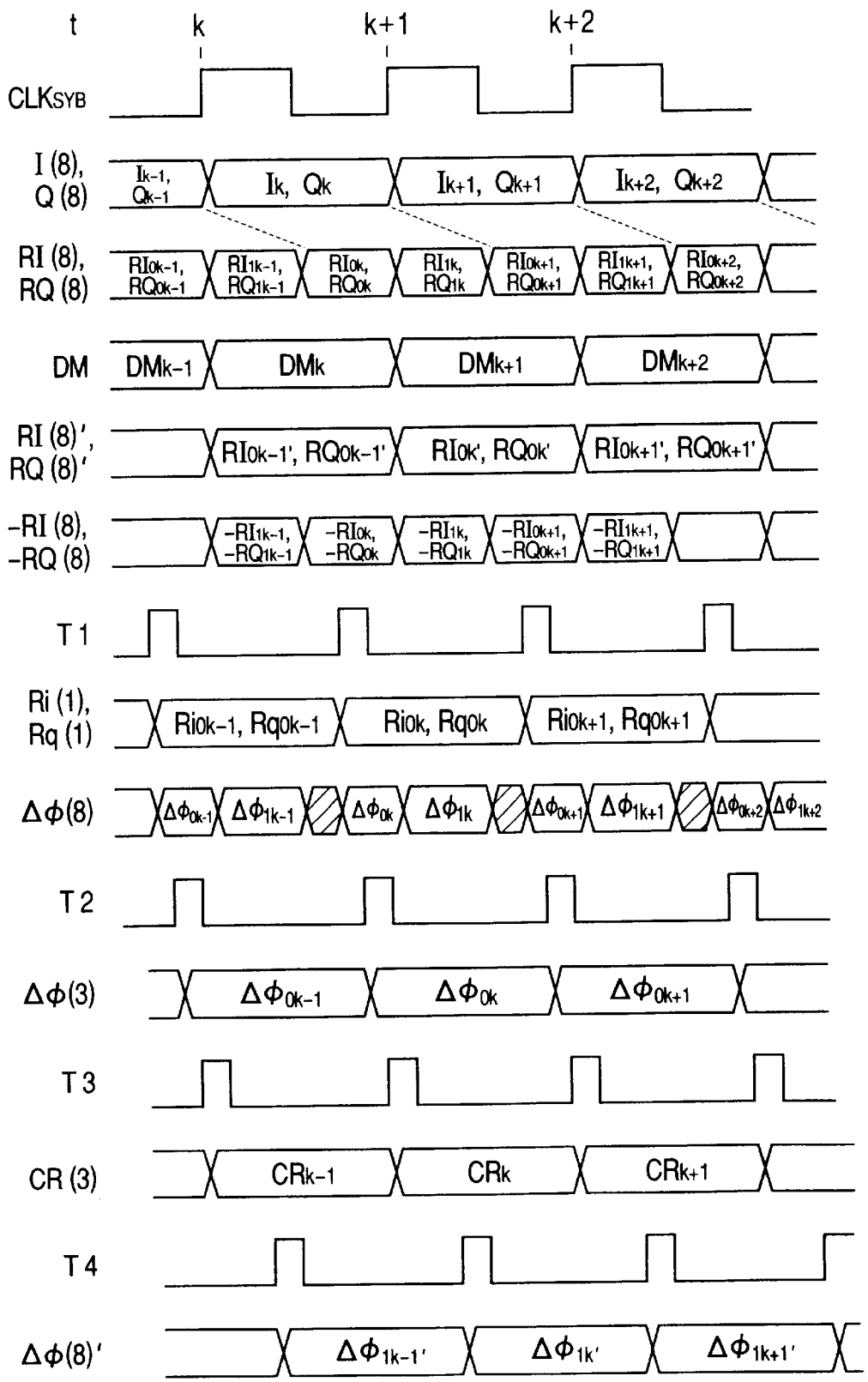
FIG. 8 is a time chart showing operations of the phase-error detecting circuit.

As shown in FIG. 8, by assuming that the demodulating circuit 1A outputs a new I and Q symbol-stream data set $\{I_t(8), Q_t(8)\}$ in symbols synchronously with a symbol clock $CLK_{SYB}$ whenever the $CLK_{SYB}$ is activated at a time t (t= ..., k−1, k, k+1, ...), the remapper 7A captures $\{I_t(8), Q_t(8)\}$ at the inactivation timing of the $CLK_{SYB}$ to output an I and Q symbol-stream data set $\{RI_{0t}(8), RQ_{0t}(8)\}$ phase-rotated by $-\Theta$ and captures $\{I_t(8), Q_t(8)\}$ at the activation timing of the $CLK_{SYB}$ to output an I and Q symbol-stream data set $\{RI_{1t}(8), RQ_{1t}(8)\}$ phase-rotated by $-(\Theta+\Theta')$. The former I and Q symbol-stream data $RI_{0t}(8)$ and $RQ_{0t}(8)$ are latched by latch circuits 68 and 69 at the inactivation timing of the $CLK_{SYB}$ and output as absolute-phase-generated I and Q symbol-stream data $RI(8)'=RI_{0t}(8)$ and $RQ(8)'=QI_{0t}(8)$.

Figure 2:
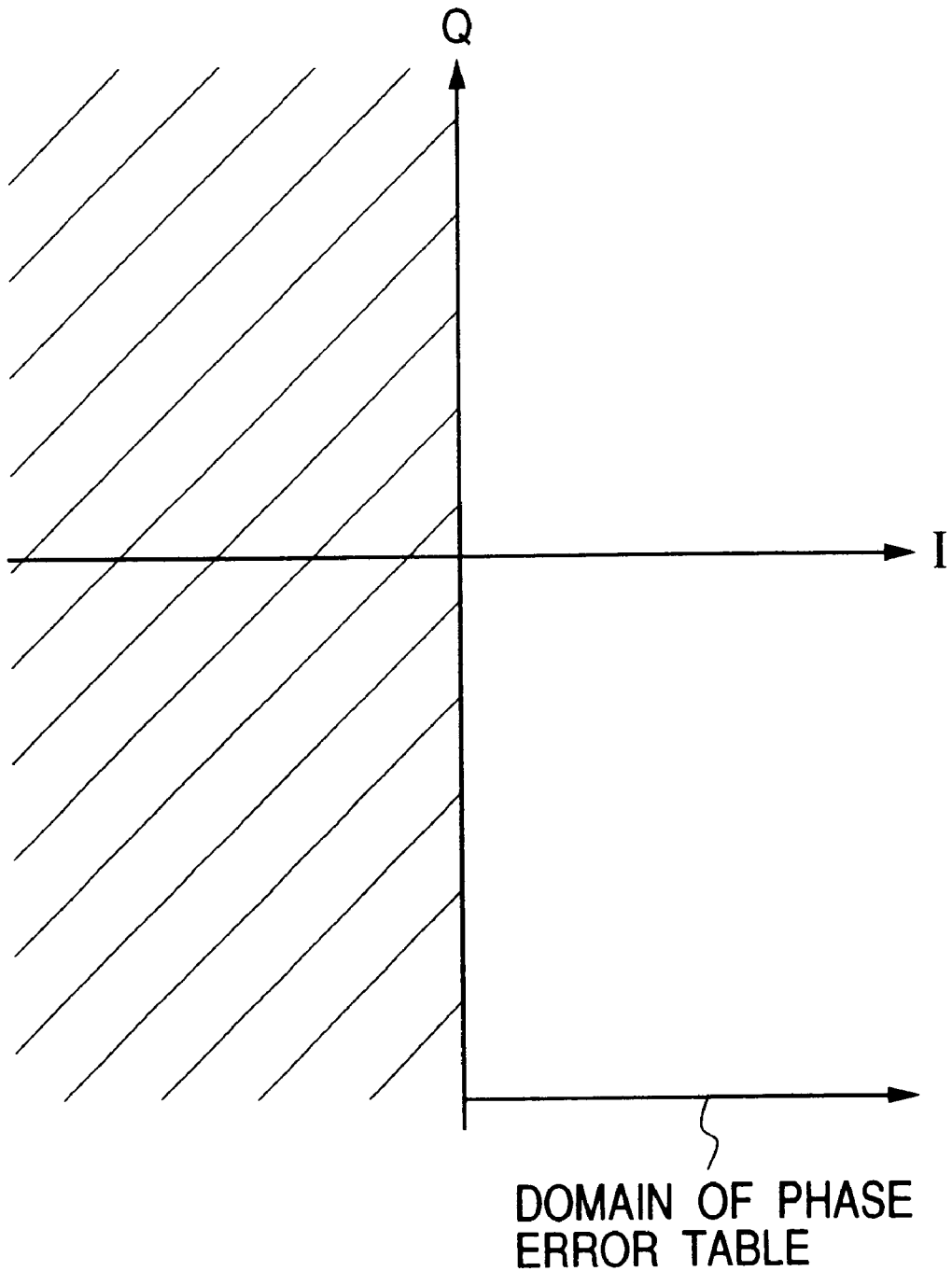
FIG. 2 is an illustration of a domain of a phase error table in FIG. 1.
Figure 3:
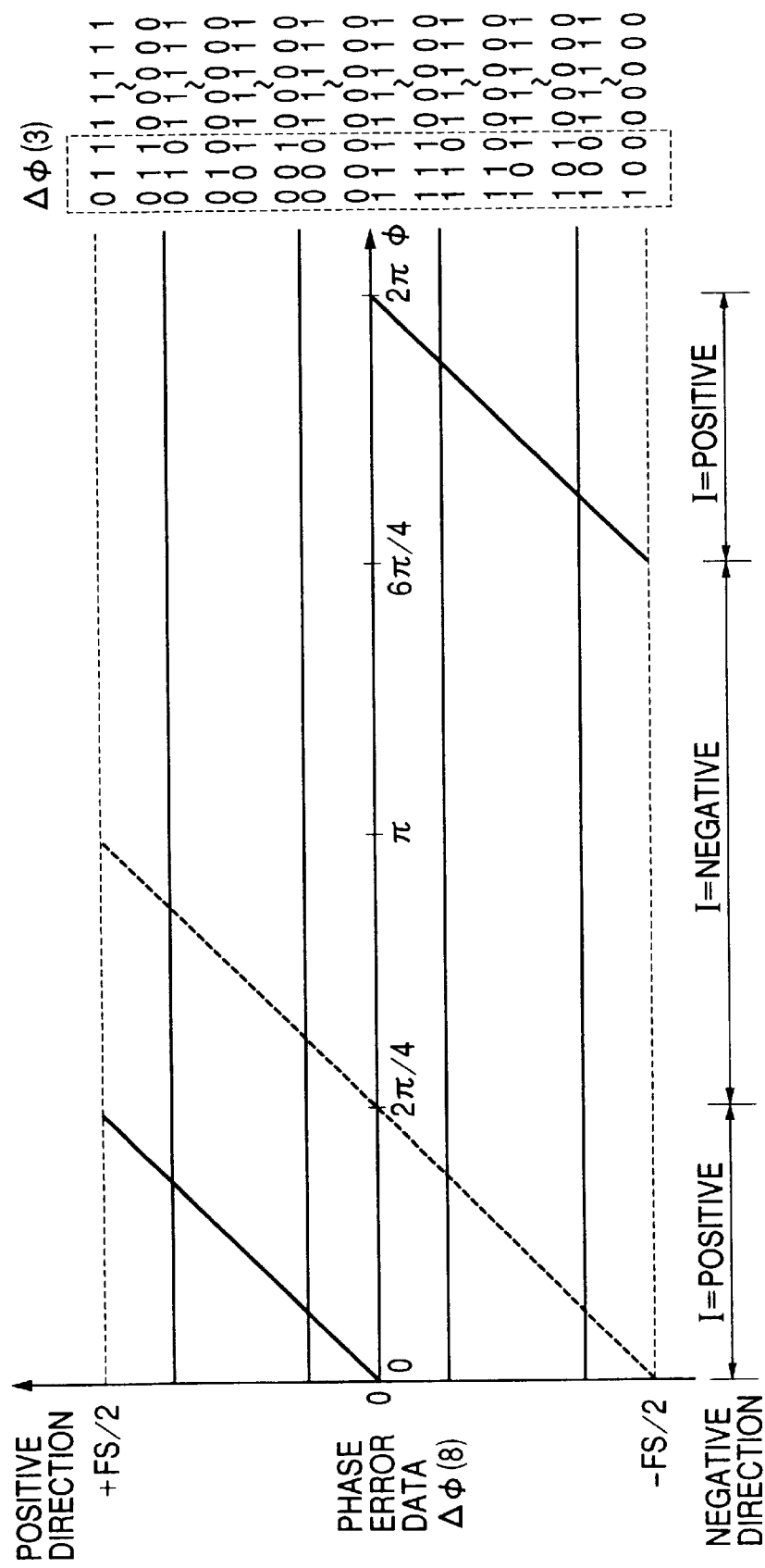
FIG. 3 is an illustration showing the relation between received-signal-point phase angle and phase error data in the phase error table in FIG. 1.

The phase error table 15-1A provided for a carrier-wave regenerating circuit 10A is obtained by forming relations between various data sets of I and Q symbol-stream data RI(8) and RQ(8) (a range of $RI(8) \geq 0$) absolute-phase-generated by the remapper 7A in accordance with the BPSK modulation system and 8 quantization bits (also referred to as phase error data of two's complement system) $\Delta\phi(8)$ into a ROM table, which is formed by using a range in which I coordinate on I-Q phase plane of I and Q symbol-stream data RI(8) and RQ(8) is equal to or more than 0 (refer to FIG. 2), in other words, a range of 0 to $2\pi/4$ and a range of $6\pi/4$ to $8\pi/4$ counterclockwise when viewed from a phase angle $\phi$ of a received-signal point as a domain (refer to a solid line in FIG. 3).

Symbol 70 denotes a phase-error detecting circuit which obtains a shift angle $\Theta'$ of I and Q symbol-stream data I(8) and Q(8) in symbols output from the demodulating circuit 1A up to a target phase convergent angle of a received-signal point shown by I and Q symbol-stream data $RI_0(8)$ and $RQ_0(8)$ for each symbol absolute-phase-generated by the remapper 7A on the basis of the positive direction of I-axis for each modulation system of a received signal currently demodulated by the demodulating circuit 1A in accordance with $RI_0(8)$ and $RQ_0(8)$, high-order-three-bit data $\Delta\phi_0(3)$ of phase error data $\Delta\phi(8)=\Delta\phi_0(8)$ corresponding to a data set of I and Q symbol-stream data $RI_0(8)$ and $RQ_0(8)$ read out of the phase error table 15-1A, and a modulation-system identifying signal DM input from the transmission-configuration identifying circuit 9 while the remapper 7A outputs the absolute-phase-generated I and Q symbol-stream data $RI(8)=RI_0(8)$ and $RQ(8)=RQ_0(8)$ at the first half of one cycle of a symbol clock $CLK_{SYB}$. Moreover, the circuit 70 calculates $(\Theta+\Theta')$ to output it to the remapper 7A and makes the remapper 7A output I and Q symbol-stream data $RI_1(8)$ and $RQ_1(8)$ obtained by inversely phase-rotating input I and Q symbol-stream data I(8) and Q(8) by $-(\Theta+\Theta')$ in order to detect a phase error. Then, the circuit 70 reads phase error data $\Delta\phi(8)=A\phi1(8)$ corresponding to $RI_1(8)$ and $RQ_1(8)$ out of the phase error table 15-1 to output the data to the D/A converter 17.

Figure 4:
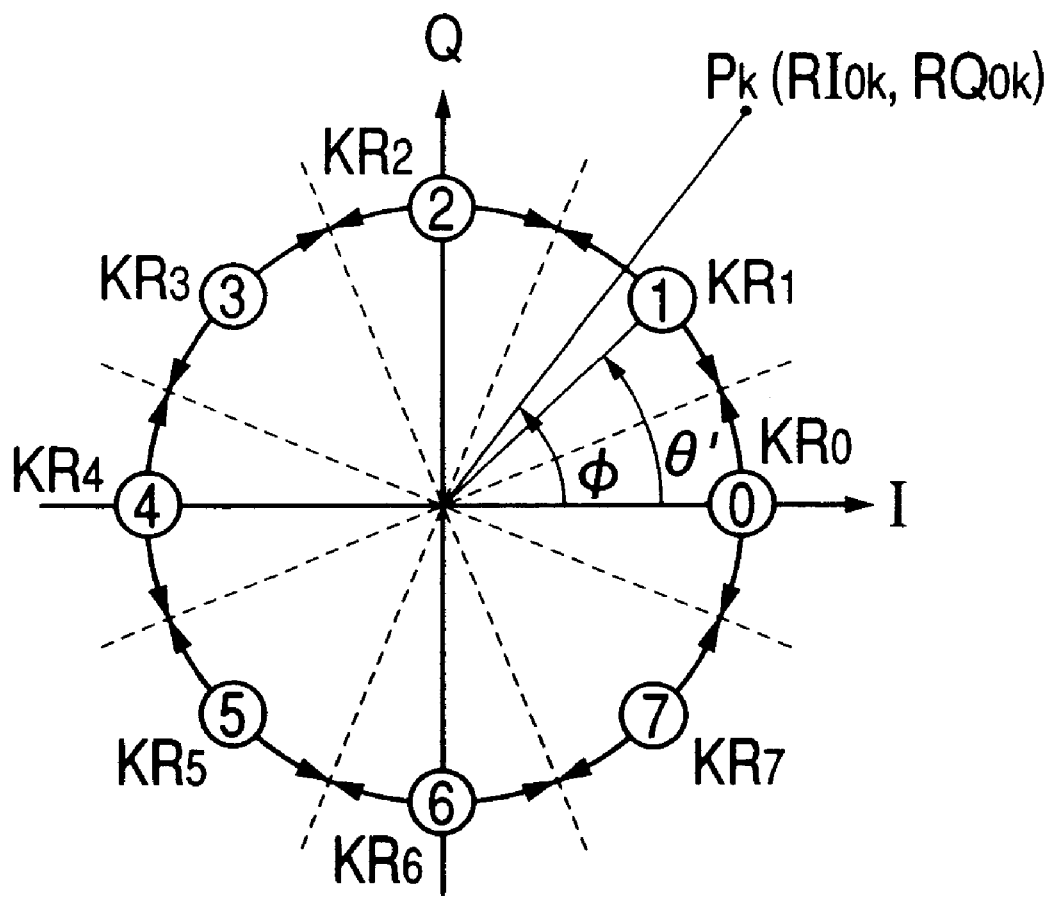
FIG. 4 is an illustration showing operations of a phase-error detecting circuit.

In the case of the I and Q symbol-stream data $RI_0(8)$ and $RQ_0(8)$ absolute-phase-generated by the remapper 7A, received-signal points 8PSK-mapped to signal point arrangements "0" to "7" at the transmission side are respectively kept in any one of areas $KR_0$ to $KR_7$ eight-divided about phases 0, $\pi/4$, $2\pi/4$, $3\pi/4$, $4\pi/4$, $5\pi/4$, $6\pi/4$, and $7\pi/4$ on the I-Q phase plane in FIG. 4. If a received-signal point $P_k$ ($RI_{0k}$, $RQ_{0k}$) of a symbol at a time t=k is kept in $KR_i$ (i=0–7)(phase angle $\phi$), a target phase convergent angle of the received-signal point $P_k$ according to the phase correcting operation for the reference carrier waves $f_{c1}$ and $f_{c2}$ by the carrier-wave regenerating circuit 10A is equal to $i\cdot(\pi/4)$. A shift angle $\Theta'$ in the positive direction of I-axis becomes equal to $i\cdot(\pi/4)$. In this case, phase error data $\Delta\phi(8)=\Delta\phi_{1k}(8)$ when inputting I and Q symbol-stream data $RI_{1k}(8)$ and $RQ_{1k}(8)$ obtained by inversely phase-rotating I and Q symbol-stream data $I_k(8)$ and $Q_k(8)$ by $-(\Theta+\Theta')$ to the phase error table 15-1A is the same as the phase error data for $RI_{0k}(8)$ and $RQ_{0k}(8)$ when viewed through a graph obtained by moving a solid line graph in FIG. 3 by $\Theta'$ in the positive direction of $\phi$-axis.

Figure 17:
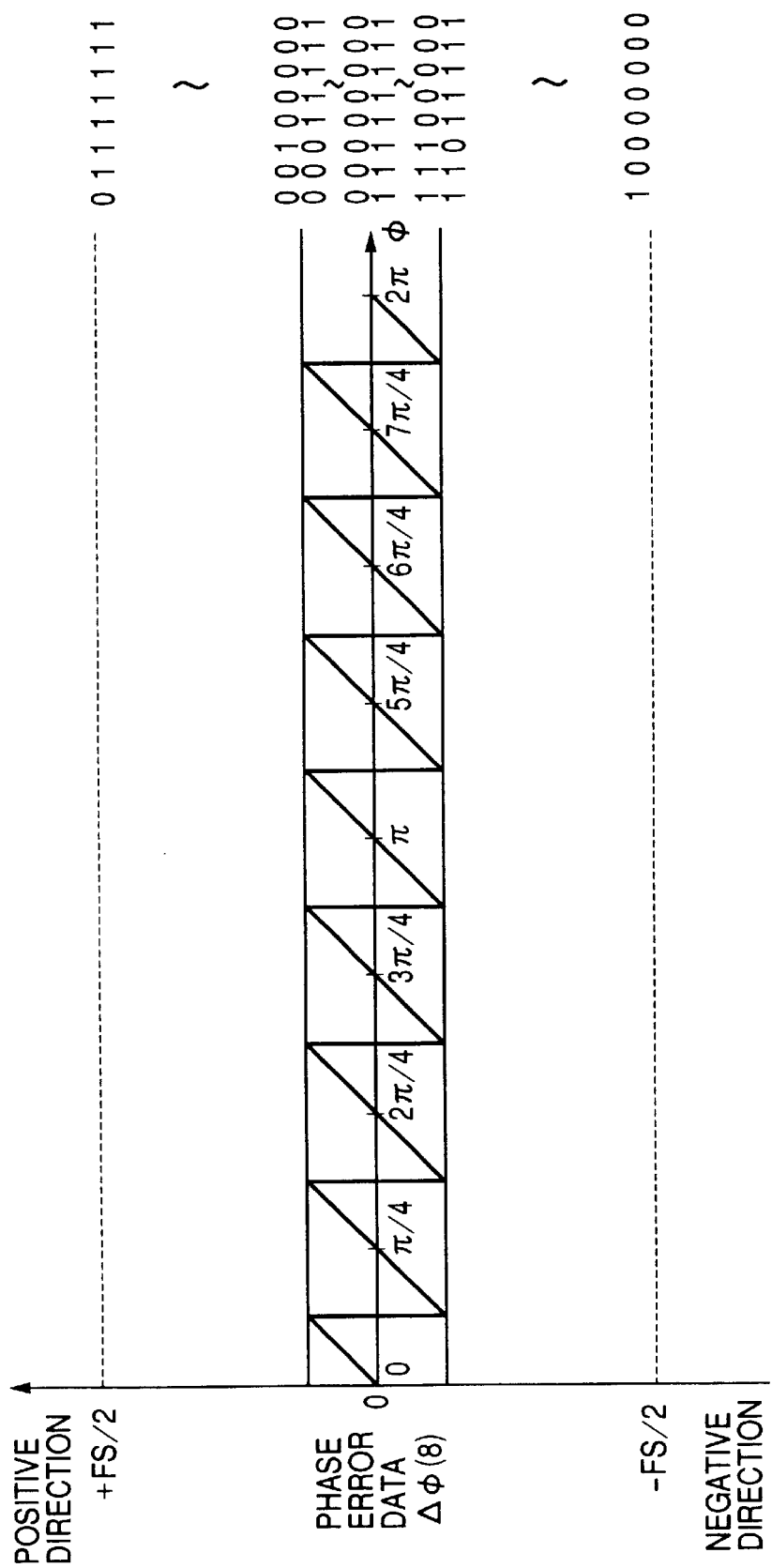
FIG. 17 is an illustration of a phase error table for 8PSK.

For example, when the received-signal point $P_k$ is kept in an area $KR_2$ and a shift angle $\Theta'$ is measured in the positive direction of I-axis, phase error data $\Delta\phi(8)$ is obtained which corresponds to $RI_{0k}(8)$ and $RQ_{0k}(8)$ when moving the solid line graph in FIG. 3 by $2\pi/4$ in the positive direction of $\phi$-axis and replacing it with a broken-line graph. The portion of $\phi=3\pi/8$ to $5\pi/8$ of the broken-line graph in FIG. 3 is the same as that of $\phi=3\pi/8$ to $5\pi/8$ corresponding to the area $KR_2$ in FIG. 17. The same is applied to a case in which i is not equal to 2. Therefore, phase error data corresponding to absolute-phase-generated I and Q symbol-stream data $I_{0k}(8)$ and $Q_{0k}(8)$ in the phase error table in FIG. 17 is obtained by $\Delta\phi_{1k}(8)$. Because the I and Q symbol-stream data $I_{0k}(^8)$ and $Q_{0k}(8)$ are absolute-phase-generated, a target phase convergent angle of a received-signal point $P_k$ becomes same as a signal point arrangement of the transmission side and thus, a carrier-wave phase error to the received-signal point $P_k$ according to the 8PSK modulation system is correctly obtained independently of a received-signal-phase rotation angle $\Theta$.

Differently from the above described, in the case of I and Q symbol-stream data $R_{I0}(8)$ and $R_{Q0}(8)$ absolute-phase-generated by the remapper 7A, received-signal points QPSK-mapped to signal point arrangements "1," "3," "5," and "7" at the transmission side are respectively kept in any one of areas $ER_0$ to $ER_3$ four-divided about phases $\pi/4$, $3\pi/4$, $5\pi/4$ and $7\pi/4$ on the I-Q phase plane in FIG. 20(1). If the received-signal point $P_k$ of a symbol at a certain time t=k is kept in an $ER_i$ (i=0–3), a target phase convergent angle of the received-signal point $P_k$ according to the phase correcting operation to the reference carrier waves $f_{c1}$ and $f_{c2}$ by the carrier-wave regenerating circuit 10A is equal to $i\cdot(2\pi/4)+\pi/4$. A shift angle $\Theta'$ in the positive direction of I-axis becomes $i\cdot(2\pi/4)+\pi/4$. In this case, phase error data $\Delta\phi(8)=\Delta\phi_{1k}(8)$ when inputting I and Q symbol-stream data $RI_{1k}(8)$ and $RQ_{1k}(8)$ obtained by inversely phase-rotating I and Q symbol-stream data $I_k(8)$ and $Q_k(8)$ by $-(\Theta+\Theta')$ to the phase error table 15-1A is the same as phase error data for $RI_{0k}(8)$ and $RQ_{0k}(8)$ when viewed through a graph obtained by moving the solid line graph in FIG. 3 in the positive direction of $\phi$-axis by $\Theta$.

Figure 5:
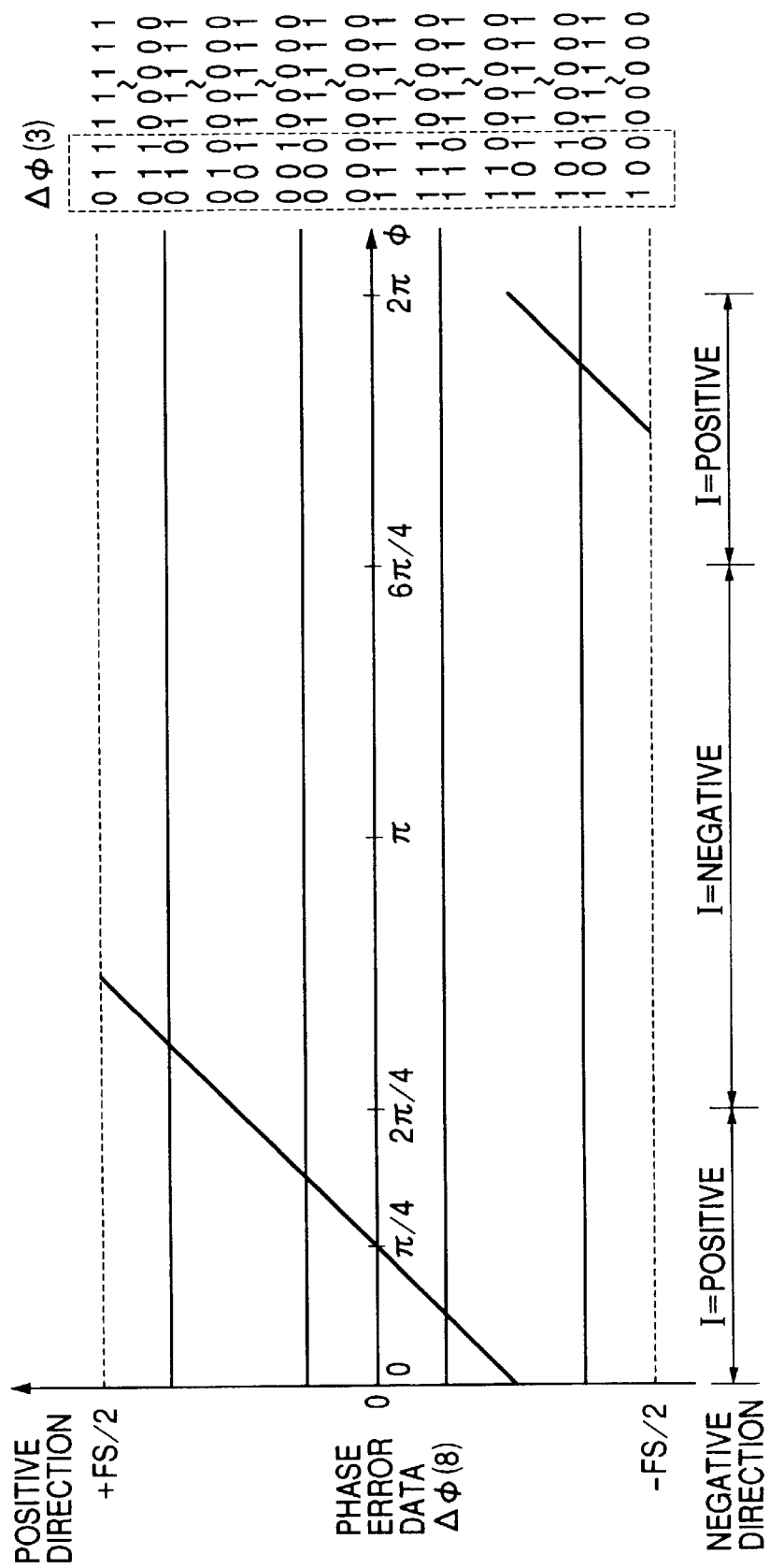
FIG. 5 is an illustration showing operations of the phase-error detecting circuit.
Figure 18:
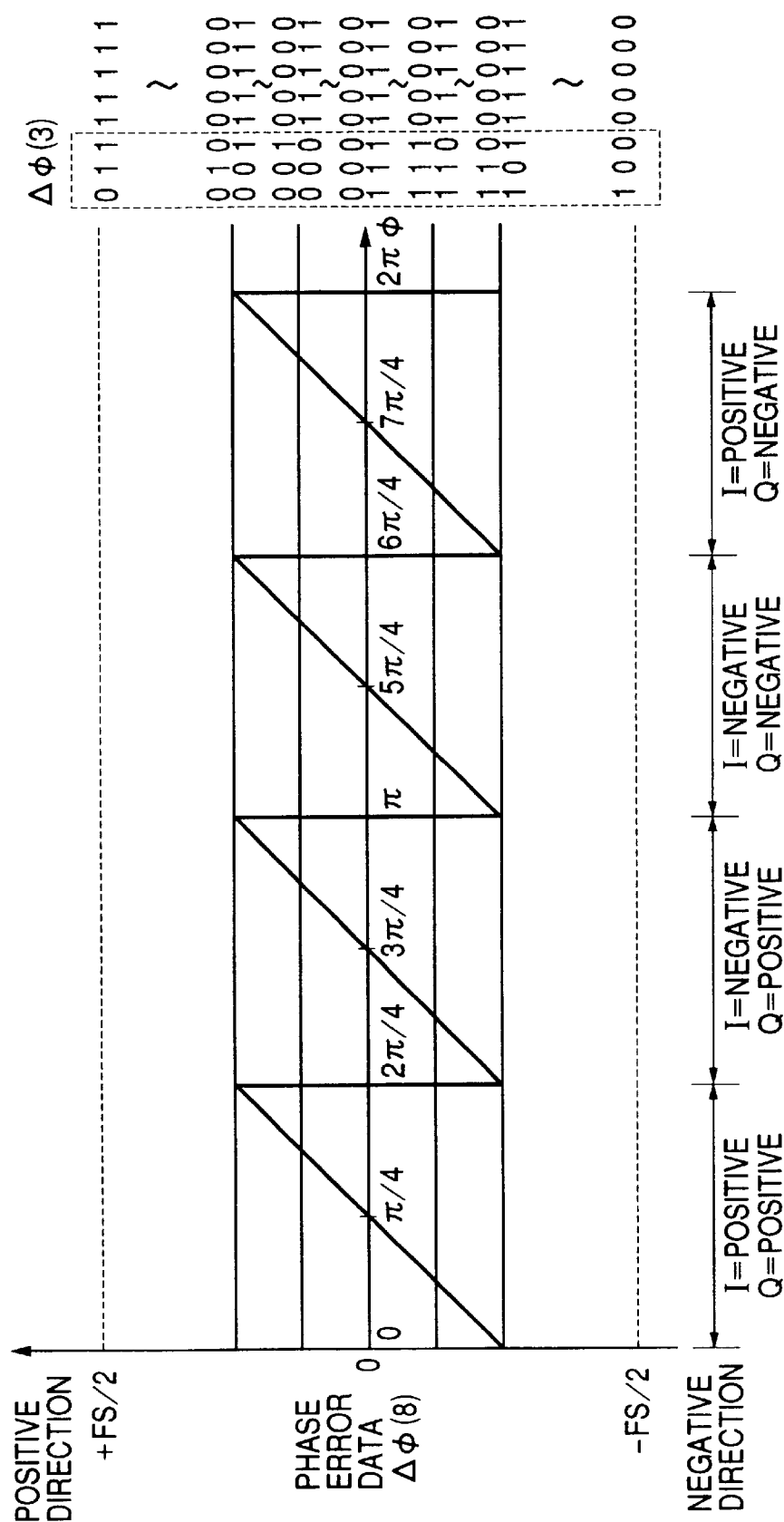
FIG. 18 is an illustration of a phase error table for QPSK.
Figure 19:
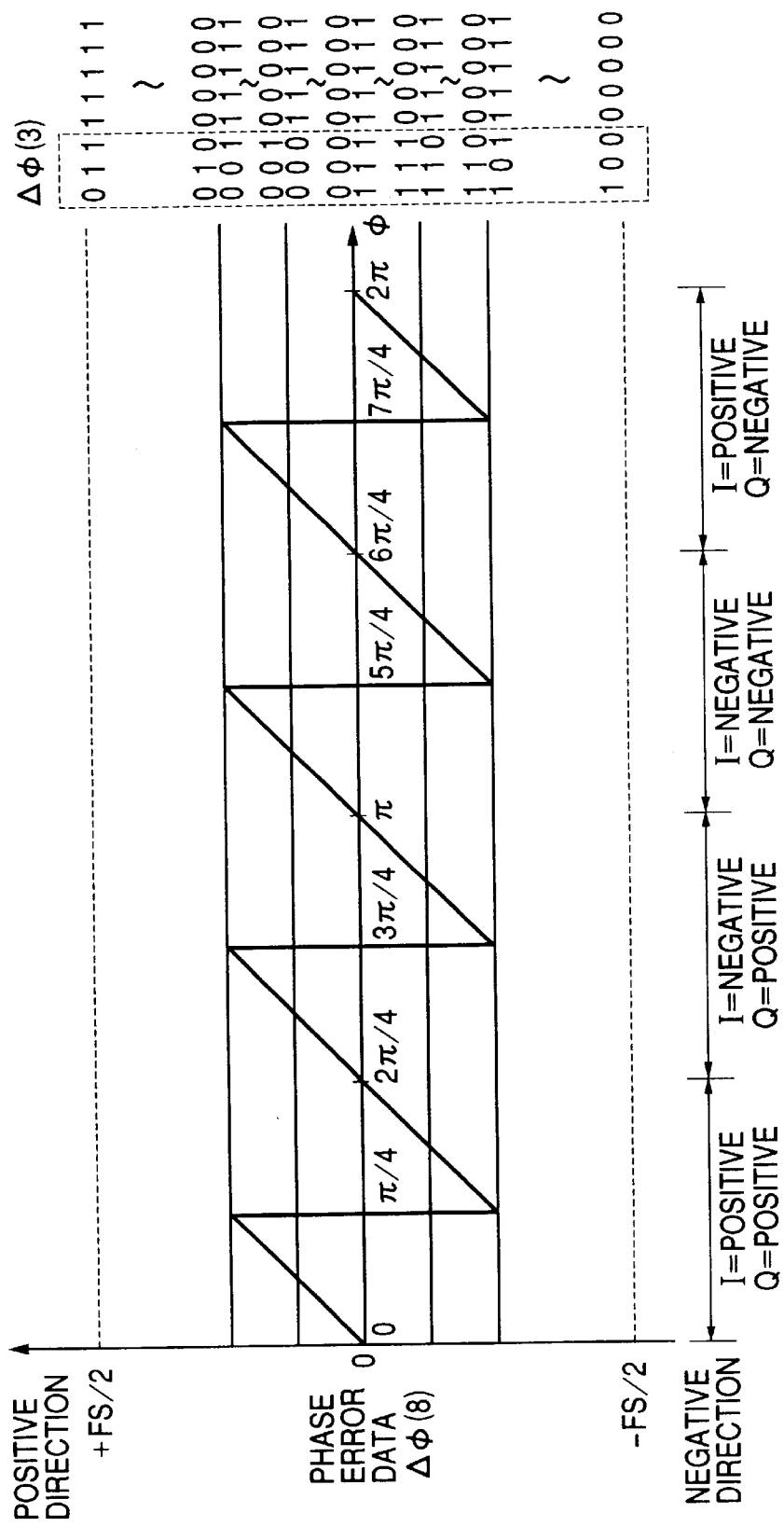
FIG. 19 is the illustration of the phase error table for QPSK.

For example, when the received-signal point $P_k$ is kept in the area ERo and a shift angle $\Theta'$ is measured in the positive direction of I-axis, phase error data $\Delta\phi(8)$ is obtained which corresponds to $RI_{0k}(8)$ and $RQ_{0k}(8)$ when moving the solid table in FIG. 3 by $\pi/4$ in the positive direction of $\phi$-axis and replacing the table with the graph in FIG. 5. The portion of $\phi=0–2\pi/4$ of the graph in FIG. 5 is the same as the portion of $\phi=0–2\pi/4$ corresponding to the area $ER_0$ in FIG. 18. The same is applied to a case in which i is not equal to 0. Therefore, phase error data corresponding to absolute-phase-generated I and Q symbol-stream data $I_{0k}(8)$ and $Q_{0k}(8)$ in the phase error table in FIG. 18 is obtained by $\Delta\phi_{1k}(8)$. Because the I and Q symbol-stream data $I_{0k}(8)$ and $Q_{0k}(8)$ are absolute-phase-generated, a target phase convergent angle of the received-signal point $P_k$ becomes the same as a transmission-side signal point arrangement and a carrier-wave phase error to the received-signal point $P_k$ according to the QPSK modulation system is correctly obtained independently of a received-signal-phase rotation angle $\Theta$.

Figure 25:
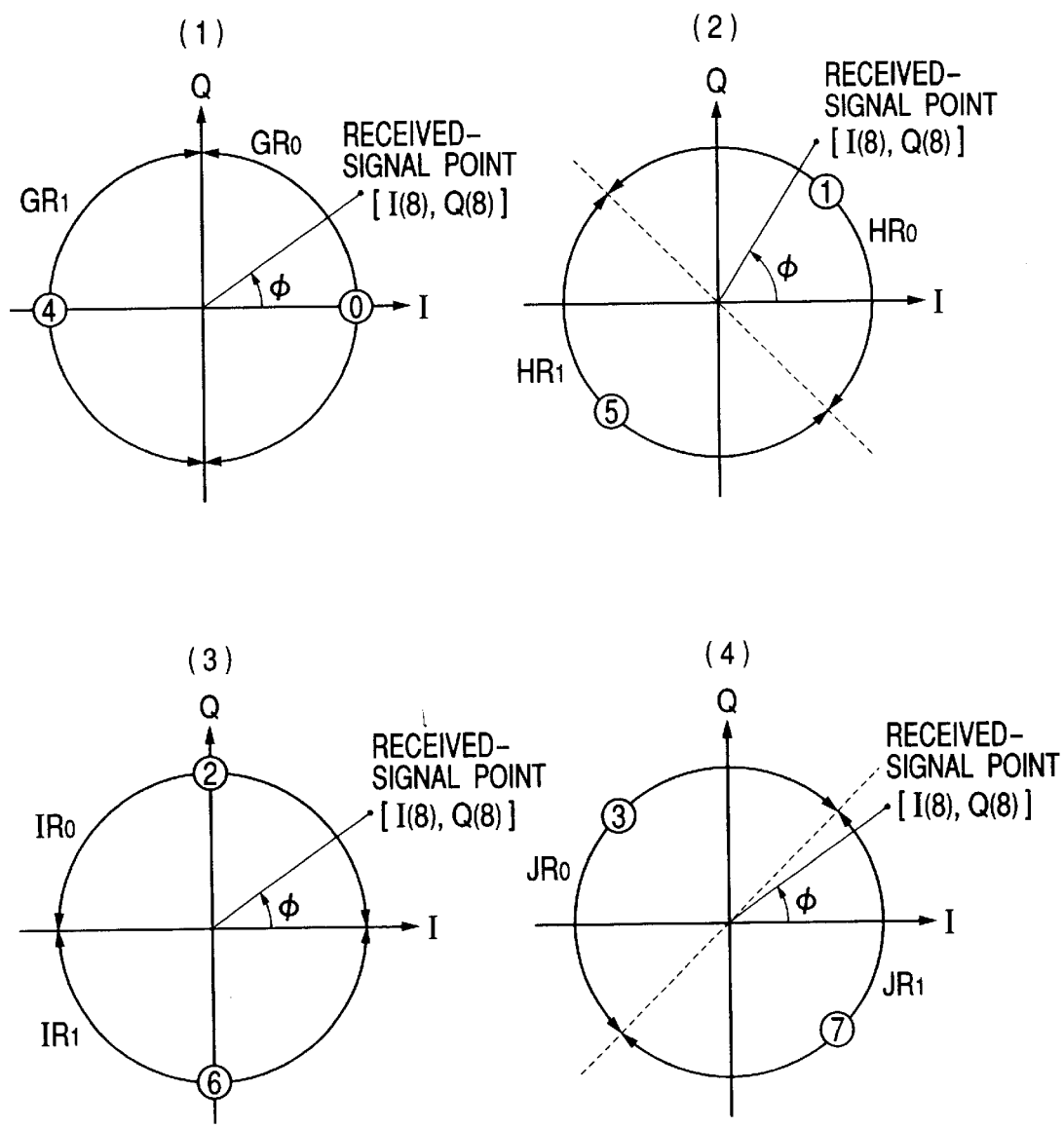
FIGS. 25(1) to 25(4) are illustrations for explaining relations between phase angles and target phase convergent angles of received-signal points for BPSK.
Figure 26:
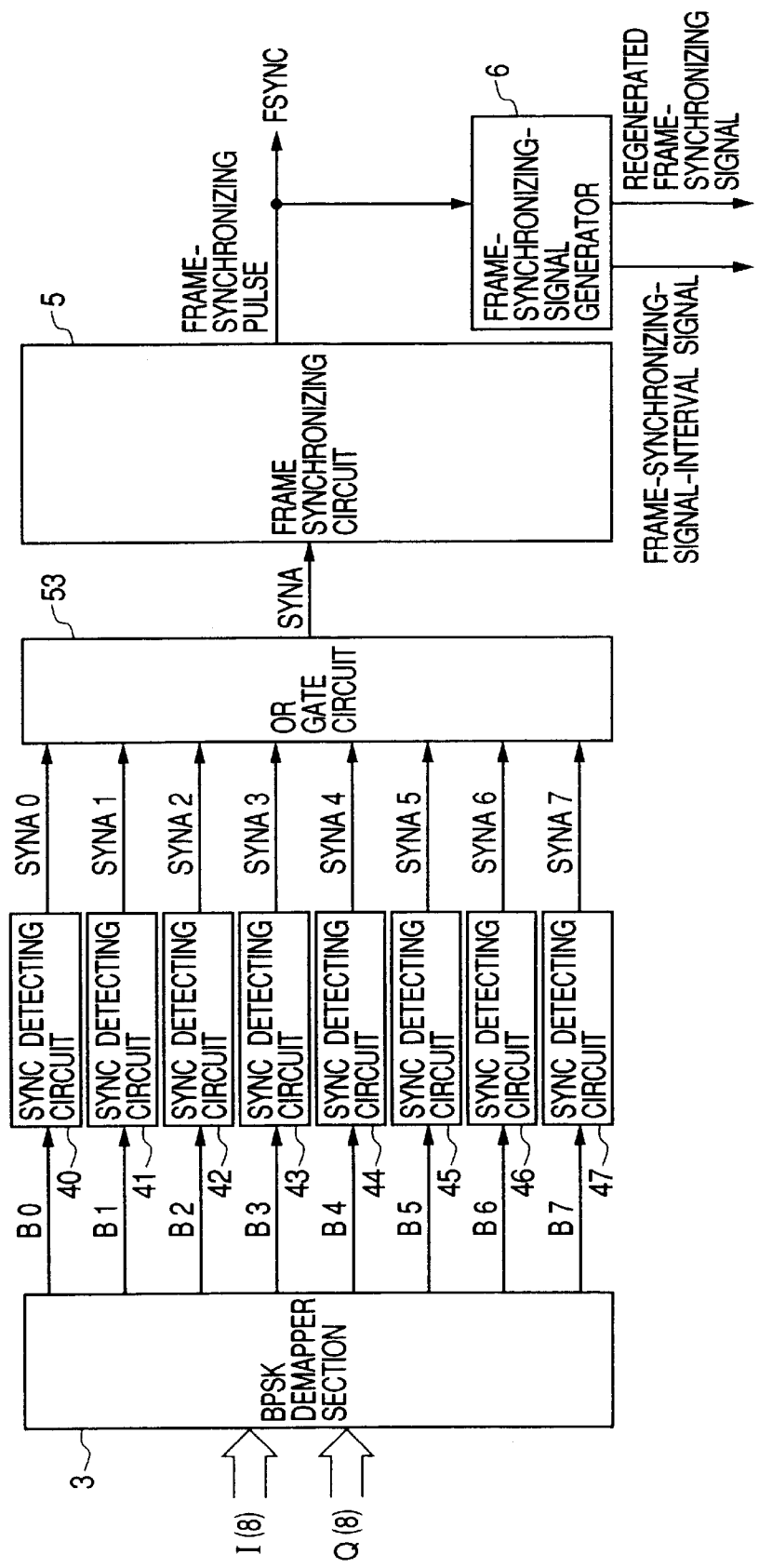
FIG. 26 is a block diagram of a sync detecting/regenerating circuit in FIG. 12.
Figure 28:
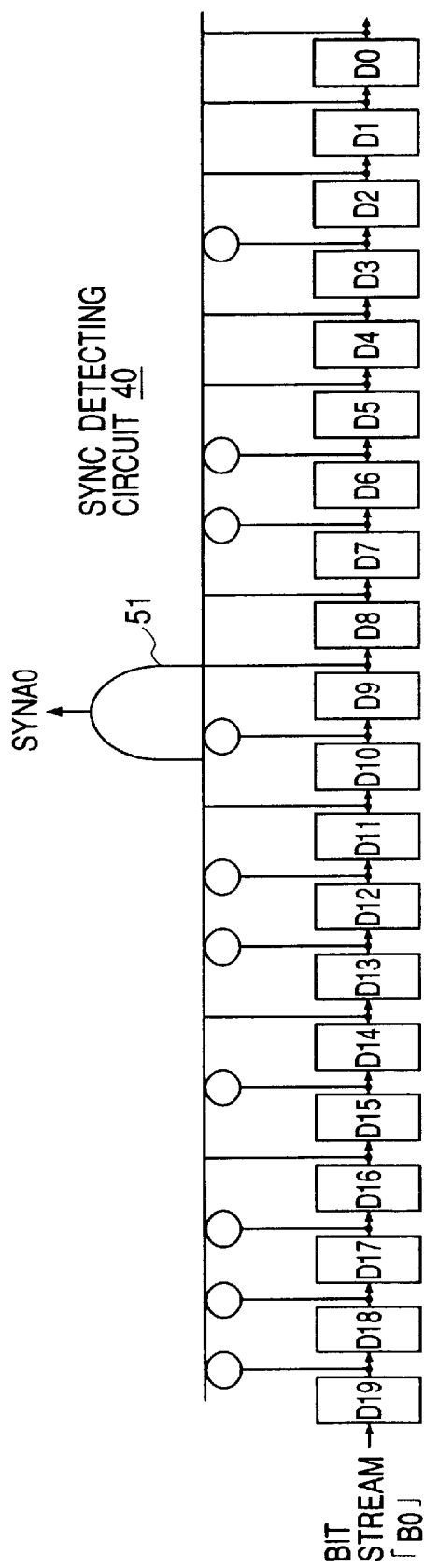
FIG. 28 is a circuit diagram showing a configuration of a sync detecting circuit in FIG. 26.
Figure 29:
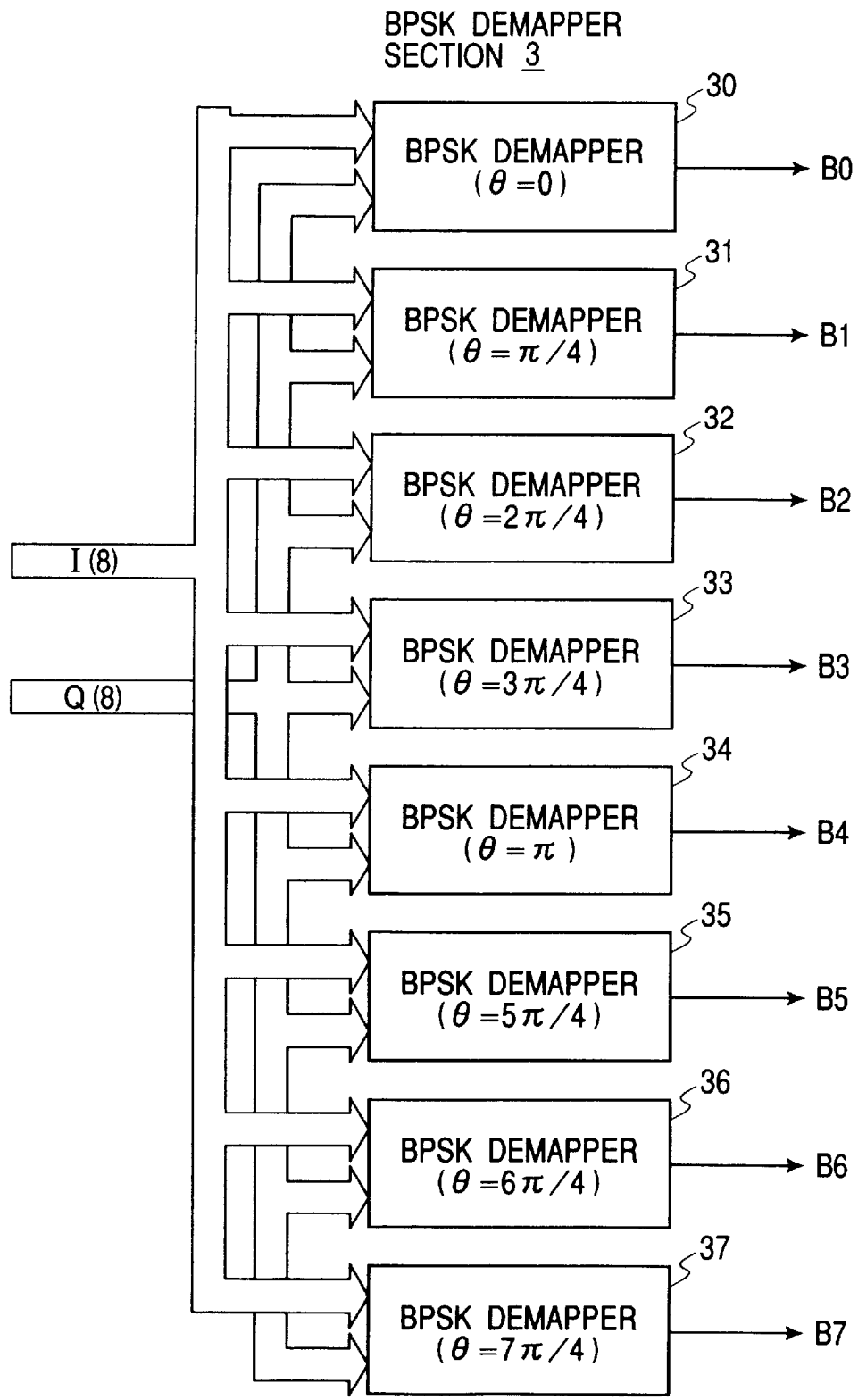
FIG. 29 is a circuit diagram showing a configuration of BPSK demappers in FIG. 26.
Figure 31:
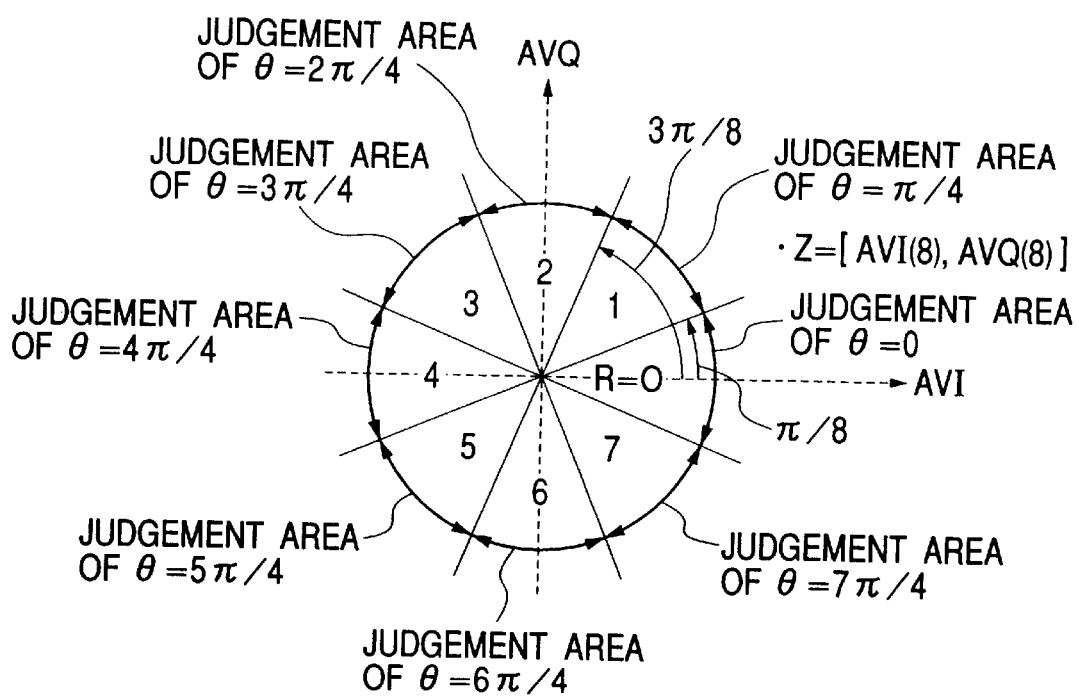
FIG. 31 is an illustration of a received-signal-phase-rotation-angle discriminating table used by the received-phase judging circuit in FIG. 12.

Moreover, in the case of I and Q symbol-stream data $RI_0(8)$ and $RQ_0(8)$ absolute-phase-generated by the remapper 7A, received-signal points BPSK-mapped to signal point arrangements "0" and "4" at the transmission side are respectively kept in either of areas $GR_0$ and $GR_1$ two-divided about phases 0 and $4\pi/4$ on the I-Q phase plane in FIG. 25(1). If the received-signal point $P_k$ of a symbol is kept in a $GR_i$ (i=0, 1) at a certain time t=k, a target phase convergent angle of the received-signal point $P_k$ according to the phase correcting operation to the reference carrier waves $f_{c1}$ and $f_{c2}$ by the carrier-wave regenerating circuit 10A is equal to $i\cdot(4\pi/4)$. A shift angle $\Theta'$ in the positive direction of I-axis becomes $i\cdot(4\pi/4)$ (however, when measuring the shift angle $\Theta'$ in the negative direction of I-axis, the $\Theta'$ becomes $i\cdot(4\pi/4)-\pi$). In this case, phase error data $\Delta\phi(8)=\Delta\phi_{1k}(8)$ when inputting I and Q symbol-stream data $RI_{1k}(8)$ and $RQ_{1k}(8)$ obtained by inversely phase-rotating I and Q symbol-stream data $I_k(8)$ and $Q_k(8)$ by $-(\Theta+\Theta')$ to the phase error table 15-1A is the same as phase error data for $RI_{Ok}(8)$ and $RQ_{Ok}(8)$ when viewed through a graph obtained by moving the solid line graph in FIG. 3 in the positive direction of $\phi$-axis by $\Theta'$.

Figure 6:
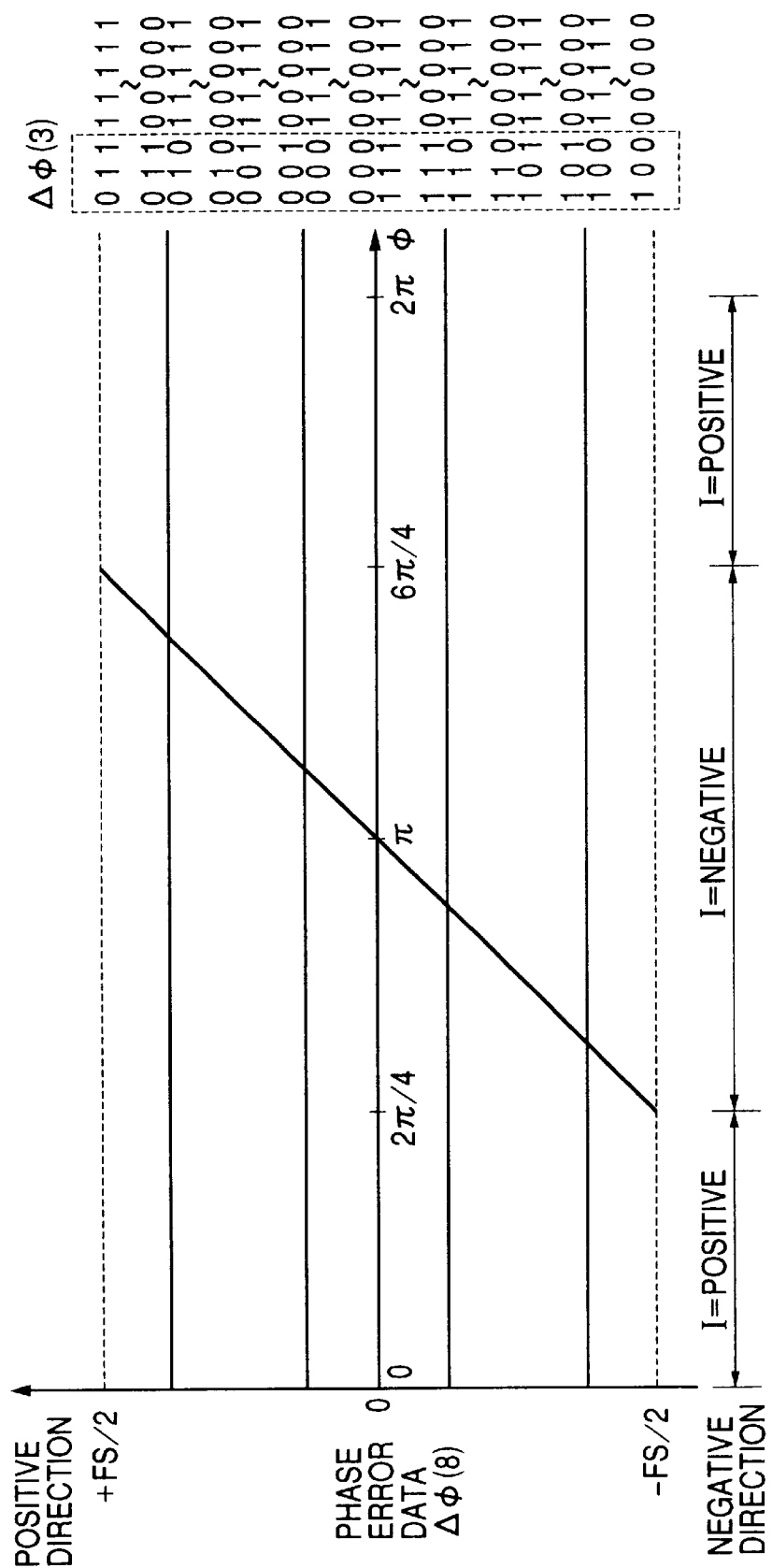
FIG. 6 is an illustration showing operations of the phase-error detecting circuit.
Figure 21:
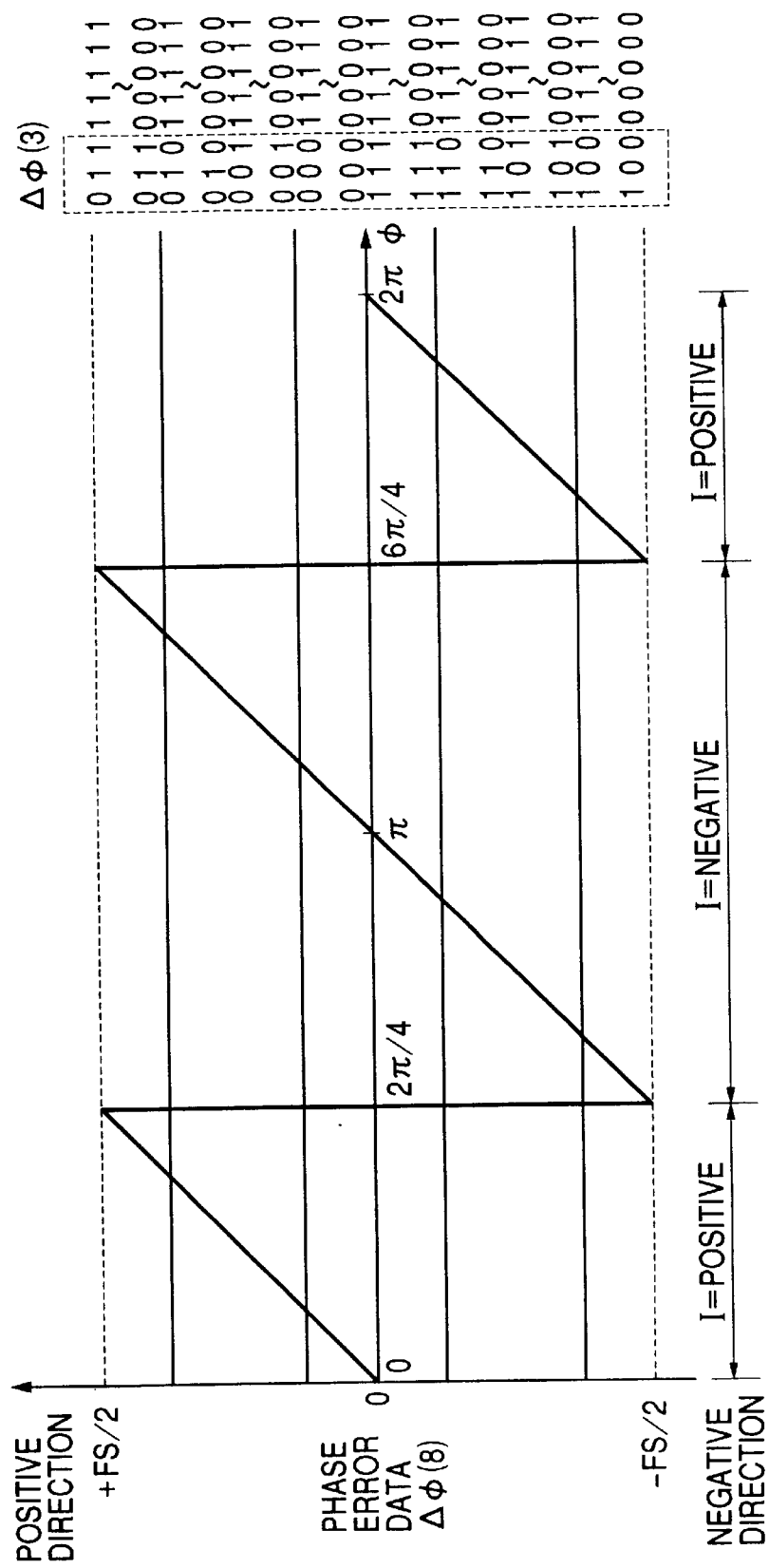
FIG. 21 is an illustration of a phase error table for BPSK.
Figure 22:
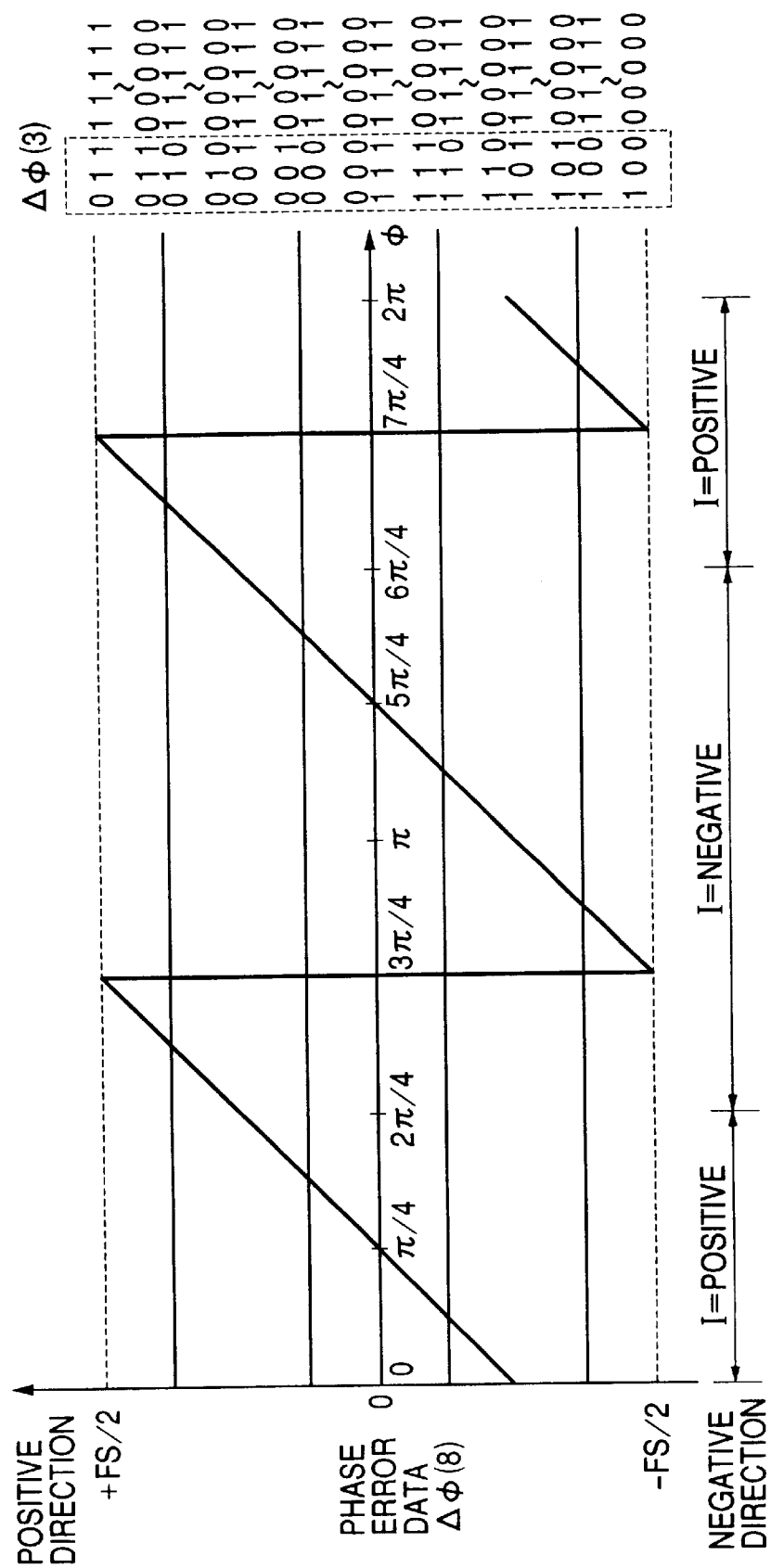
FIG. 22 is an illustration of the phase error table for BPSK.
Figure 23:
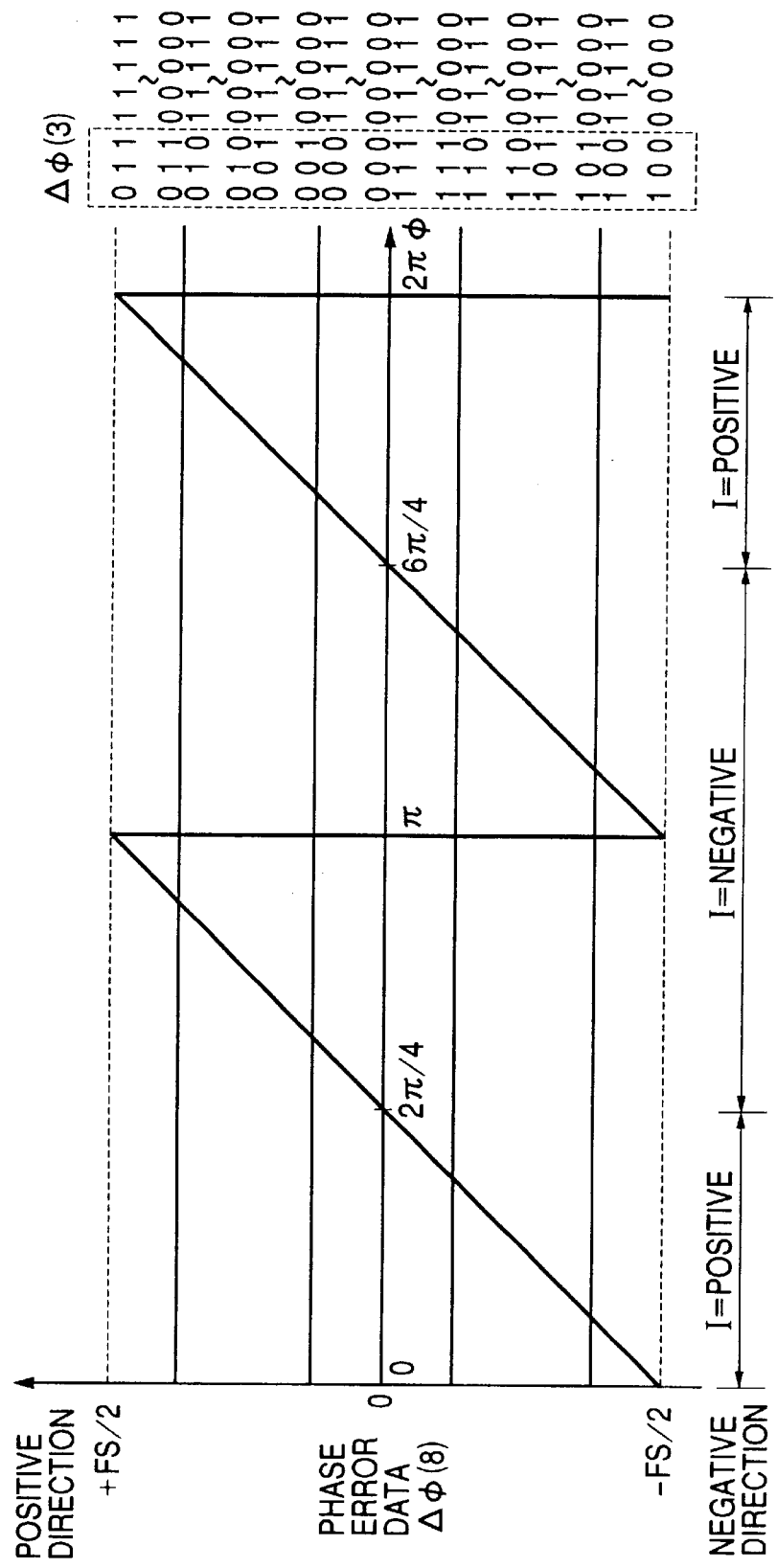
FIG. 23 is an illustration of a phase error table for BPSK.
Figure 24:
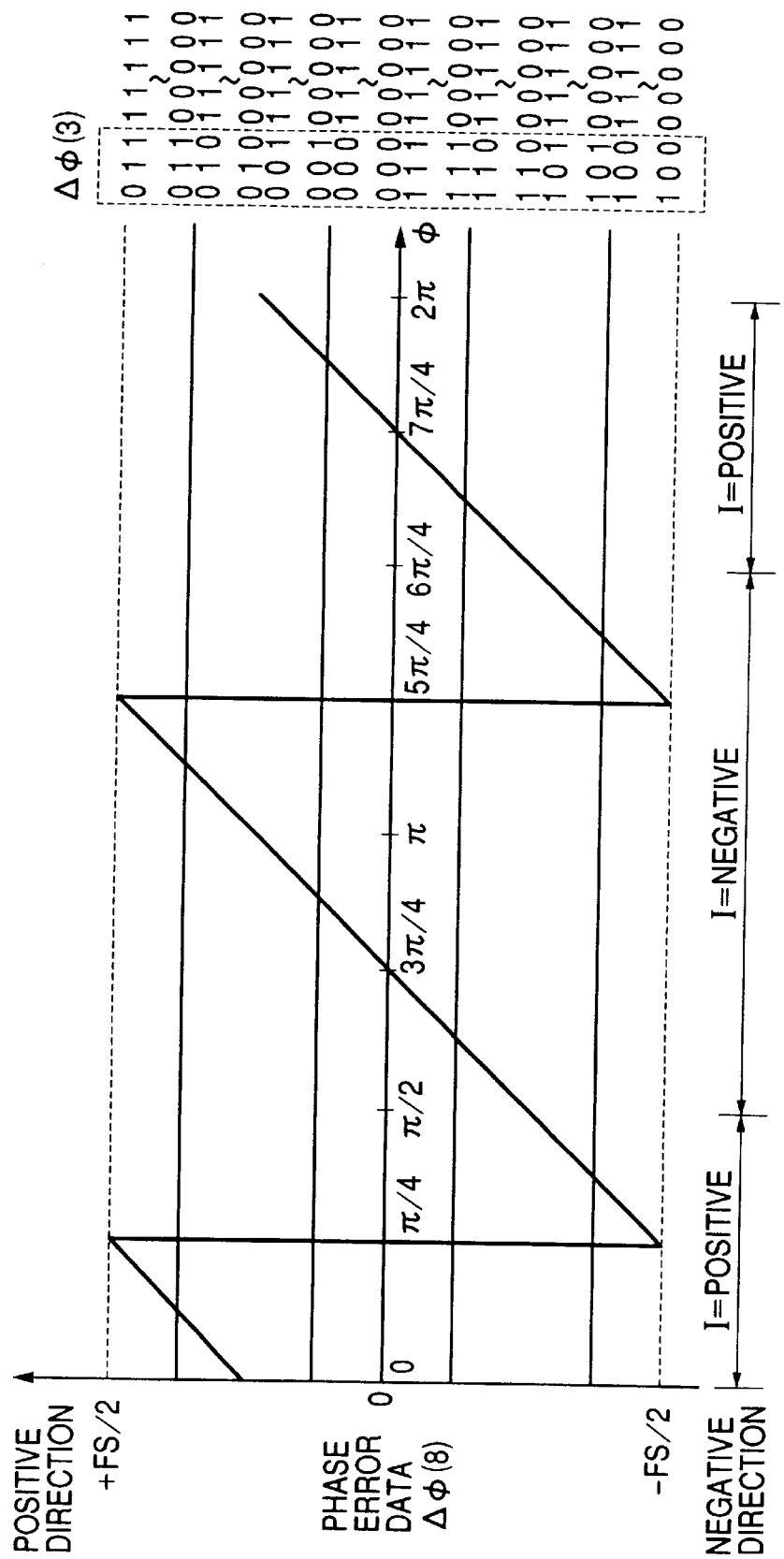
FIG. 24 is an illustration of the phase error table for BPSK.

For example, when the received-signal point $P_k$ is kept in the area $GR_I$ and a shift angle $\Theta'$ is measured in the positive direction of I-axis, phase error data $\Delta\phi(8)$ is obtained which corresponds to $RI_{Ok}(8)$ and $RQ_{Ok}(8)$ when moving the solid line graph in FIG. 3 by $\pi$ in the positive direction of $\phi$-axis and replacing the graph with the graph in FIG. 6. The portion of $\phi=2\pi/4-6\pi/4$ of the graph in FIG. 6 is the same as the portion of $\phi=2\pi/4-6\pi/4$ corresponding to the area GRo in FIG. 21. The same is applied to a case in which i is equal to 0. Therefore, phase error data corresponding to absolute-phase-generated I and Q symbol-stream data $I_{Ok}(8)$ and $Q_{Ok}(8)$ in the phase error table in FIG. 21 is obtained by $\Delta\phi_{1k}(8)$. Because the I and Q symbol-stream data $I_{Ok}(8)$ and $Q_{Ok}(8)$ are absolute-phase-generated, a target phase convergent angle of the received-signal point $P_k$ becomes the same as a transmission-side signal point arrangement and a carrier-wave phase error to the received-signal point $P_k$ according to the BPSK modulation system is correctly obtained independently of a received-signal-phase rotation angle $\Theta$.

Figure 7:
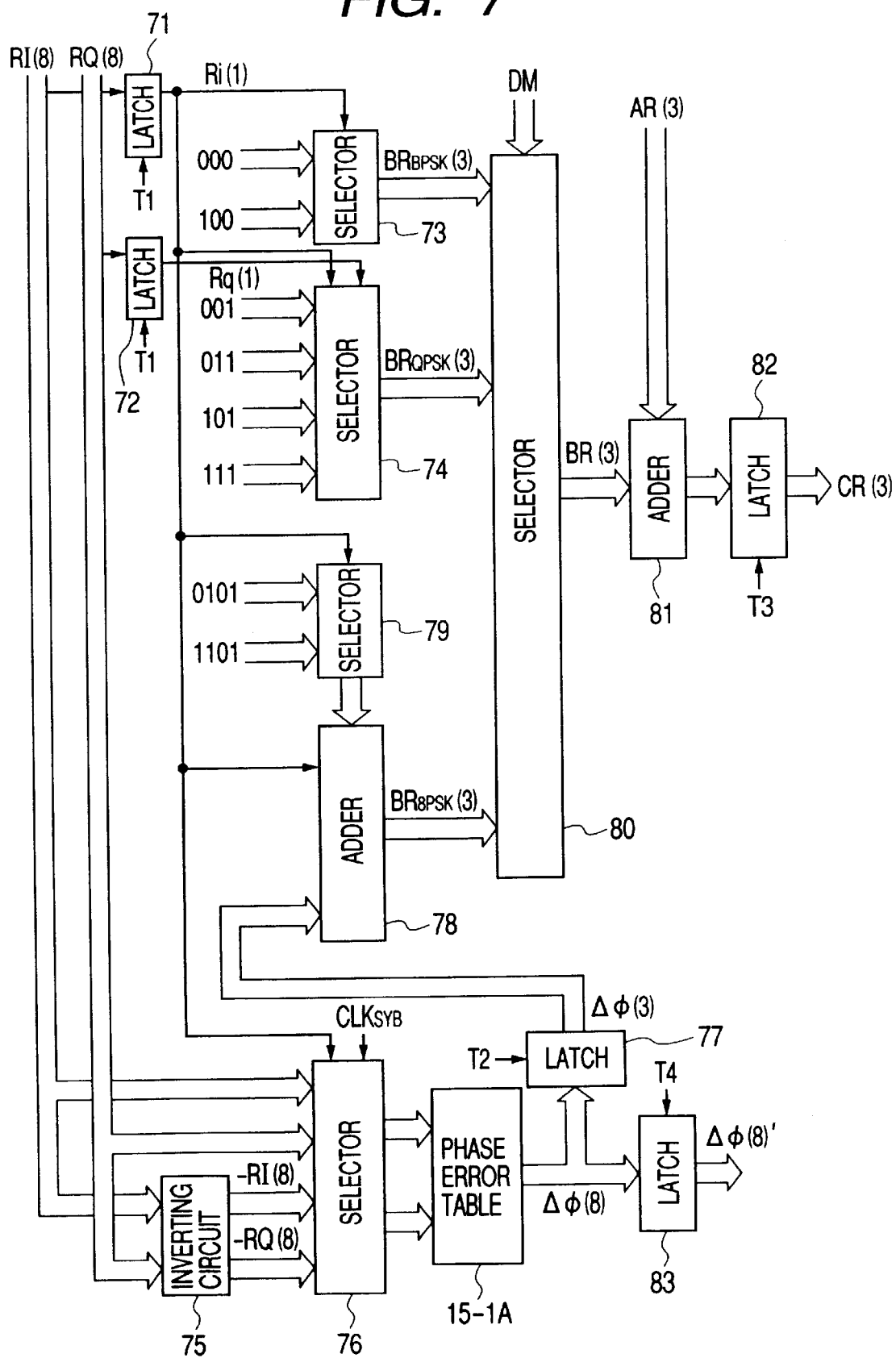
FIG. 7 is a block diagram showing a configuration of the phase-error detecting circuit.

FIG. 7 is a block diagram showing a specific configuration of the phase-error detecting circuit 70 and FIG. 8 is a time chart showing operations of the phase-error detecting circuit 70. The configuration of the phase-error detecting circuit 70 is described below by referring to FIG. 8. An angle $\Theta'$ takes any one of 0, $\pi/4$, $2\pi/4$, $3\pi/4$, $4\pi/4$, $5\pi/4$, $6\pi/4$, and $7\pi/4$ which are respectively shown by one of two-bit three-digit values such as (000), (001), (010), (011), (100), (101), (110), and (111) in order.

To make the description understandable, I and Q symbol-stream data $I_k(8)$ and $Q_k(8)$ for one symbol output from the demodulating circuit 1A at a time t=k is described below as an example. The $I_k(8)$ and $Q_k(8)$ are output as a data set of $RI_k(8)=RI_{Ok}(8)$ and $RQ_k(8)=Q_{Ok}(8)$ rotated by $-\Theta$ through time sharing during one cycle of $CLK_{SYB}$ and absolute-phase-generated by the remapper 7A and a data set of $RI_k(8)=I_{1k}(8)$ and $RQ_k(8)=Q_{1k}(8)$ rotated by $-(\Theta+\Theta')$ through time sharing during one cycle of $CLK_{SYB}$ by the remapper 7A. The former is latched by the latch circuits 68 and 69 and output to the rear stage.

Symbols 71 and 72 in the phase-error detecting circuit 70 latch the sign bit data serving as the MSB of $RI_{Ok}(8)$ and $RQ_{Ok}(8)$ output from the remapper 7A whenever a predetermined timing signal T1 is input and output the data as $Ri(1)=Ri_{Ok}(1)$ and $Rq(1)=Rq_{Ok}(1)$. Symbol 73 denotes a selector which selects and outputs (000) showing $\Theta'=0$ when $RI_{Ok}(8)$ is equal to or larger than 0 or selects and outputs (100) showing $\Theta'=4\pi/4$ when $RI_{Ok}(8)$ is smaller than 0 depending on the positive or negative of $RI_{Ok}(8)$ shown by $Ri_{Ok}(1)$ and thereby, when the portion of the BPSK modulation system in a received signal according to the hierarchical transmission system is demodulated, outputs a shift angle $\Theta'=BR_{BPSK}(3)$ up to a target phase convergent angle of a received-signal point $P_k$ shown by $RI_{Ok}(1)$ and $RQ_{Ok}(1)$ viewed in the positive direction of I-axis. The selector 73 selects (000) because $P_k$ is kept in the area $GR_0$ in FIG. 25(1) and the target phase convergent angle is equal to 0 when $RI_{Ok}(8)$ is equal to or larger than 0 and selects (100) because $P_k$ is kept in the area $GR_1$ in FIG. 25(1) and the target phase convergent angle is equal to $4\pi/4$ when $RI_{Ok}(8)$ is smaller than 0.

Symbol 74 denotes a selector which selects and outputs (001) showing $\Theta'=\pi/4$, (011) showing $\Theta'=3\pi/4$, (101) showing $\Theta'=5\pi/4$, or (111) showing $\Theta'=7\pi/4$ in accordance with a combination of positive and negative of $RI_{Ok}(8)$ and $RQ_{Ok}(8)$ shown by $Ri_{Ok}(1)$ and $Rq_{Ok}(1)$ and thereby, outputs a shift angle $\Theta'=BR_{QPSK}(3)$ up to a target phase convergent angle of the received-signal point $P_k$ shown by $RI_{Ok}(1)$ and $RQ_{Ok}(1)$ viewed in the positive direction of I-axis when the portion of QPSK modulation system in a received signal according to the hierarchical transmission system is demodulated.

Specifically, the selector 74 selects (001) because $P_k$ is kept in the area $ER_0$ in FIG. 20(1) and a target phase convergent angle is equal to $\pi/4$ when $RI_{Ok}(8)$ is equal to or larger than 0 and $RQ_{Ok}(8)$ is equal to or larger than 0 and selects (011) because $P_k$ is kept in the area $ER_1$ in FIG. 20(1) and a target phase convergent angle is equal to $3\pi/4$ when $RI_{Ok}(8)$ is smaller than 0 and $RQ_{Ok}(8)$ is equal to or larger than 0. Moreover, the selector 74 selects (101) because $P_k$ is kept in the area $ER_2$ in FIG. 20(1) and a target phase convergent angle is equal to $5\pi/4$ when $RI_{Ok}(8)$ is smaller than 0 and $RQ_{Ok}(8)$ is smaller than 0 and selects (111) because $P_k$ is kept in the area $ER_3$ in FIG. 20(1) and a target phase convergent angle is equal to $7\pi/4$ when $RI_{Ok}(8)$ is smaller than 0 and $RQ_{Ok}(8)$ is equal to or larger than 0.

Symbol 75 denotes an inverting circuit which outputs $-RI_k(8)=-RI_{Ok}(8)$ and $-RQ_k(8)=-RQ_{Ok}(8)$ obtained by inverting only positive and negative of $RI_k(8)=RI_{Ok}(8)$ and $RQ_k(8)=RQ_{Ok}(8)$ though their absolute values are equal to each other. A phase angle of a received-signal point shown by $-RI_{Ok}(8)$ and $-RQ_{Ok}(8)$ is equal to a value obtained by adding $\pi$ to a phase angle $\phi$ of a received-signal point shown by original $RI_{Ok}(8)$ and $RQ_{Ok}(8)$. Symbol 76 denotes a selector which directly inputs $RI_k(8)=RI_{Ok}(8)$ and $RQ_k(8)=RQ_{Ok}(8)$ to the phase error table 15-1A when $RI_{Ok}(1)$ shows $RI_{Ok}(8) \geq 0$ while $CLK_{SYB}$ is inactivated and makes the phase error table 15-1A output phase error data $\Delta\phi_k(8)=\Delta\phi_{Ok}(8)$ corresponding to $RI_{Ok}(8)$ and $RQ_{Ok}(8)$ and reads the data. However, when $RI_{Ok}(1)$ shows $RI_{Ok}(8)<0$, the selector 76 inputs $-RI_{Ok}(8)$ and $-RQ_{Ok}(8)$ to be kept in the graph of the phase error table 15-1A to the table 15-1A and makes the table 15-1A output phase error data $\Delta\phi_k(8)=\Delta\phi_{Ok}(8)$ corresponding to $-RI_{Ok}(8)$ and $-RQ_{Ok}(8)$ to read the data $\Delta\phi_k(8)$.

Moreover, the selector 76 directly inputs RI(8) and RQ(8) output from the remapper 7A to the phase error table 15-1A while $CLK_{SYB}$ is activated and makes the table 15-1A output phase error data $\Delta\phi(8)$ corresponding to the RI(8) and RQ(8) to read the data $\Delta\phi(8)$.

Symbol 77 denotes a latch circuit which judges whether the absolute value of a phase error is larger or smaller than $(\pi/8)+s (\pi/4)$ (s is 0 or 1) in accordance with phase error data $\Delta\phi_k(3)=\Delta\phi_{Ok}(3)$ serving as high-order three bits of phase error data $\Delta\phi_k(8)=\Delta\phi_{Ok}(8)$ output from the phase error table 15-1A whenever a predetermined timing signal T2 is input (refer to FIG. 3). By combining the $\Delta\phi_k(3)$ with sign bit data $RI_{Ok}(1)$ serving as the MSB of $RI_{Ok}(8)$ and performing a simple operation, it is known in which area among eight areas $KR_0$ to $KR_7$ in FIG. 4 a received-signal point $P_k$ shown by $RI_{Ok}(8)$ and $RQ_{Ok}(8)$ is kept when the portion of the 8PSK modulation system in a received signal according to the hierarchical transmission system is demodulated and it is possible to output a shift angle $\Theta'=BR_{8PSK}(3)$ up to a target phase convergent angle of the received-signal point $P_k$ shown by the $RI_{Ok}(8)$ and $RQ_{Ok}(8)$ viewed in the positive direction of I-axis.

Symbol 78 denotes a four-bit adder for adding 4-bit data (however, carry to fifth bit is not performed) in which $Ri(1)=Ri_{Ok}(1)$ is input to the most significant bit of one input side and an output of a latch circuit 74 is input to low-order three bits. Moreover, a selector 79 is connected to the other input side of the adder 78 to output (0101) when $RI_{0k}(1)$ shows $RI_{0k}(8) \geq 0$ and outputs (1101) correspondingly to the fact that $\pi$ is added to a phase angle $\phi$ of a received-signal point shown by $RI_{0k}(8)$ and $RQ_{0k}(8)$ when code inversion is performed by the inverting circuit 75 when the $RI_{0k}(1)$ shows $RI_{0k}(8)<0$. Then, the adder 78 performs four-bit addition of two inputs. When the portion of the 8PSK modulation system in the added value whose high-order three bits serve as a received signal in accordance with a hierarchical transmission system is demodulated, the demodulated portion shows a shift angle $\Theta'$ up to a target phase convergent angle of a received-signal point $P_k$ shown by $RI_{0k}(1)$ and $RQ_{0k}(1)$ viewed in the positive direction of I-axis. Therefore, the adder 78 outputs the shift angle $\Theta'$ as $BR_{8PSK}(3)$.

Symbol 80 denotes a selector which outputs an input supplied from the selector 73 as BR(3) showing a shift angle $\Theta'$ while the demodulating circuit 1A demodulates the BPSK-modulated portion, outputs an input supplied from the selector 74 as the BR(3) showing the shift angle $\Theta'$ while the demodulating circuit 1A demodulates the QPSK-modulated portion, and outputs an input supplied from the selector 78 as the BR(3) showing the shift angle $\Theta'$ while the demodulating circuit 1A demodulates the QPSK-modulated portion in accordance with a modulation-system identifying signal DM input from the transmission-configuration identifying circuit 9. The BR(3) shows a shift angle $\Theta'$ up to a target phase convergent angle according to a modulation system currently demodulated by the demodulating circuit 1A of a received-signal point $P_k$ shown by the set data of absolute-phase-generated I and Q symbol-stream data $RI_{0k}(8)$ and $RQ_{0k}(8)$ viewed in the positive direction of I-axis while $CLK_{SYB}$ is inactivated and in the period after the timing signal T2. Symbol 81 denotes a three-bit adder (however, carry to fourth bit is not performed) which adds a received-signal-phase-rotation-angle detecting signal AR(3) output by the received-signal-phase-rotation-angle detecting circuit 8 to an output of the selector 80.

Symbol 82 denotes a latch circuit which latches an output of the adder 81 in accordance with a timing signal T3 input while $CLK_{SYB}$ is inactivated and in the period after the timing signal T2 and outputs CR(3) showing $(\Theta+\Theta')$ to the remapper 7A. When the $CLK_{SYB}$ is activated, the remapper 7A outputs $RI_{1k}(8)$ and $RQ_{1k}(8)$ whose phases are rotated by $-(\Theta+\Theta')$ against $I_k(8)$ and $Q_k(8)$. The $RI_{1k}(8)$ and $RQ_{1k}(8)$ are input to the phase error table 15-1A through the selector 76 and corresponding phase error data $\Delta\phi_k(8)=\Delta\phi_{1k}(8)$ is read. The $\Delta\phi_{1k}(8)$ is latched by a latch circuit 83 in accordance with a timing signal T4 and output to the D/A converter 17 as $\Delta\phi(8)'=\Delta\phi_{1k}(8)'$. Other components are completely the same as those in FIG. 12.

Then, operations of the above-described embodiment are briefly described below.

(1) Start of Reception

At start of reception, the received-signal-phase-rotation-angle detecting circuit 8 outputs AR(3)=(000) corresponding to a received-signal-phase rotation angle $\Theta=0$ as an initial value before a first received-signal-phase rotation angle can be detected and the transmission-configuration identifying circuit 9 outputs a modulation-system identifying signal DM corresponding to 8PSK modulation as an initial value before a first modulation system can be identified.

The remapper 7A outputs $RI_{0t}(8)(=I_t(8))$ and $RQ_{0t}(8)(=Q_t(8))$ phase-rotated by $-\Theta$ at the first half of one cycle of a symbol clock $CLK_{SYB}$ against $I_t(8)$ and $Q_t(8)$ in symbols output at a time t (t= ..., k-1, k, k+1, ...) from the demodulating circuit 1A and the $RI_{0t}(8)$ and $RQ_{0t}(8)$ are latched by the latch circuits 68 and 69 and output to the rear stage. Before the phase-error detecting circuit 70 detects a received-signal-phase rotation angle by the received-signal-phase-rotation-angle detecting circuit 8 and identifies a modulation system by the transmission-configuration identifying circuit 9, the selector 80 selects an output $BP_{8PSK}(3)$ of the adder 78 and outputs it as BR(3). Because AR(3) is (000), $CR(3)=BP_{8PSK}(3)$ is input to the remapper 7A.

The $BP_{8PSK}(3)$ shows a shift angle $\Theta'$ up to a target phase convergent angle of a received-signal point $P_{0t}$ shown by $RI_{0t}(1)$ and $RQ_{0t}(1)$ viewed in the positive direction of I-axis when regarding that every received signal follows the 8PSK modulation system (refer to FIG. 9(1)). Therefore, a received-signal point $P_{1t}$ according to $RI_{1t}(1)$ and $RQ_{1t}(1)$ phase-rotated by the remapper 7A by $-(\Theta+\Theta')$ shown by CR(3) is kept in a range of $\pi/4$ about a phase 0 on I-Q phase plane as shown in FIG. 9(2). Moreover, because the difference between the phase angle $\phi_{0t}$ and a target phase convergent angle of the received-signal point $P_{0t}$ is equal to the phase angle $\phi_{1t}$ of the received-signal point $P_{1t}$, the phase-error detecting circuit 70 is able to output correct phase error data $\Delta\phi_t(8)'=\Delta\phi_{1t}(8)$ to the D/A converter 17 when regarding that the data follows the 8PSK modulation system by reading phase error data $\Delta\phi_{1t}(8)$ corresponding to $RI_{1t}(1)$ and $RQ_{1t}(1)$ out of the phase error table 15-1A and latching the data $\Delta\phi_{1t}(8)$.

The data $\Delta\phi_{1t}(8)$ is converted into a phase error voltage by the D/A converter 17 and then, low-frequency components are extracted from the voltage by the LPF 18, and the voltage is applied to the VCO 11 as a control voltage. When the phase error data $\Delta\phi_{1t}(8)$ is equal to 0, outputs of the LPF 18 are not changed or phases of the reference carrier waves $f_{c1}$ and $f_{c2}$ are not changed. However, when phase error data $\Delta\phi(8)$ is positive, outputs of the LPF 18 are strengthened and the phase of the reference carrier waves $f_{c1}$ and $f_{c2}$ is delayed. However, when the phase error data $\Delta\phi(8)$ is negative, outputs of the LPF 18 are weakened and the phase of the reference carrier waves $f_{c1}$ and $f_{c2}$ is advanced. Thereby, the phase of the reference carrier waves $f_{c1}$ and $f_{c2}$ converges so as to keep a certain relation with a phase of received carrier wave. As a result, the demodulating circuit 1A outputs $I_t(8)$ and $Q_t(8)$ obtained by converging digital signals of signal point arrangements "0" to "7" of phases 0, $\pi/4$, $2\pi/4$, $3\pi/4$, $4\pi/4$, $5\pi/4$, $6\pi/4$, and $7\pi/4$ at the transmission side on a position rotated by $\Theta=m\times\pi/4$ (m is any one of integers 0 to 7) on the reception-side I-Q phase plane.

Figure 11:
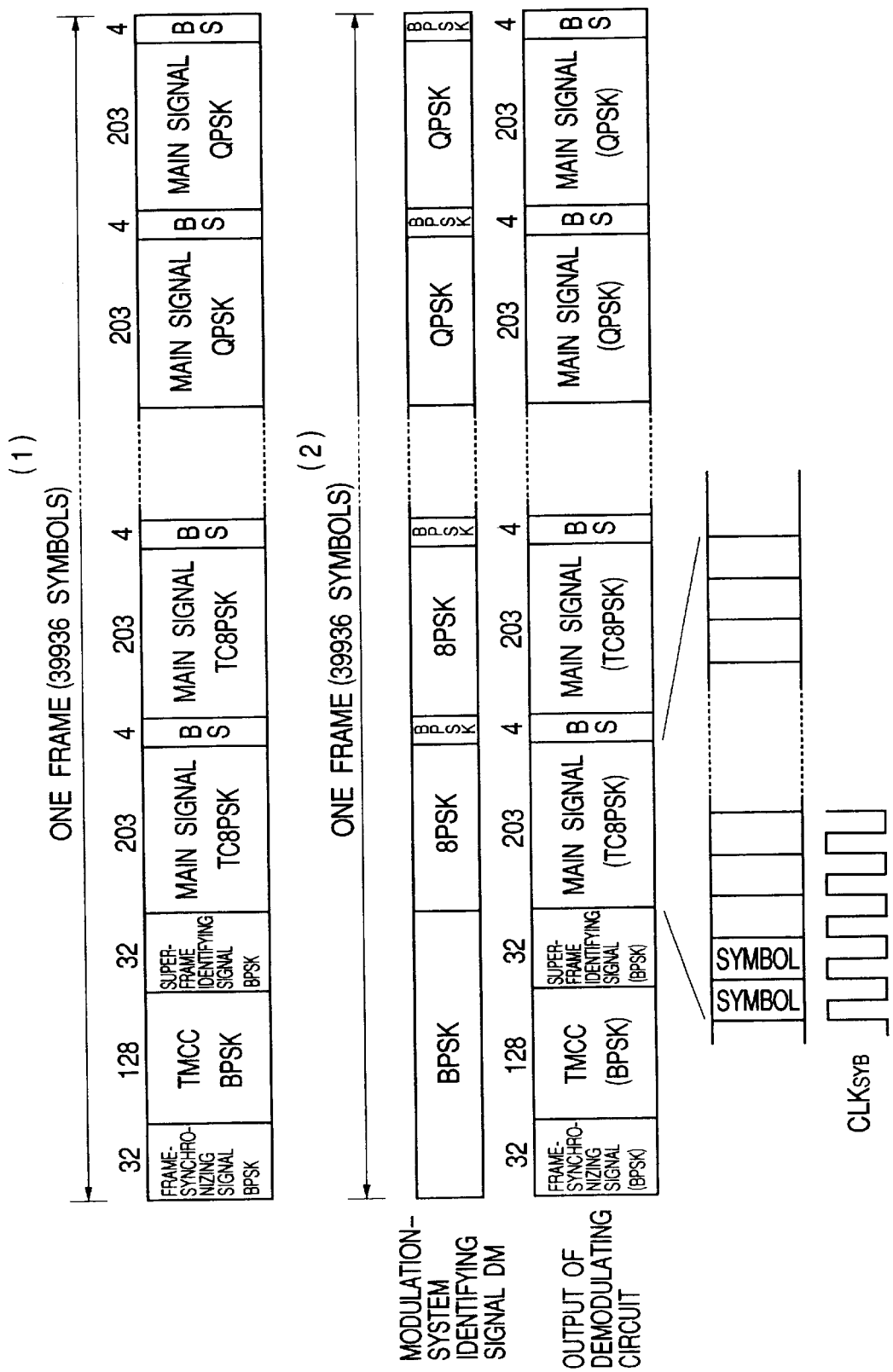
FIGS. 11(1) and 11(2) are illustrations showing frame configurations of a hierarchical transmission system.

The frame-sync detecting/regenerating circuit 5 acquires a frame-synchronizing signal in accordance with $I_t(8)$ and $Q_t(8)$ and outputs a frame-synchronizing pulse, regenerated frame-synchronizing signal, and frame-synchronizing-signal-interval signal. The received-signal-phase-rotation-angle detecting circuit 8 detects a received-signal-phase rotation angle $\Theta$ (this is shown as $\Theta_w$ in order to distinguish $\Theta$ from initial value=0) viewed through $I_t(8)$ and $Q_t(8)$ against the transmission side by using $I_t(8)$ and $Q_t(8)$, a regenerated frame-synchronizing signal, and a frame-synchronizing-signal-interval signal and outputs AR(3) showing the $\Theta_w$ to the remapper 7A and phase-error detecting circuit 70. When receiving a frame-synchronizing pulse FSYNC, the transmission-configuration identifying circuit 9 captures a bit stream Bn of a system repeatedly becoming a high potential among SYNA0 to SYNA7, extracts the TMCC pattern in FIG. 11(1) by using a predetermined timing signal generated from a frame-synchronizing pulse FSYNC and decodes the pattern, and outputs a modulation-system identifying signal DM showing which modulation system the present $I_f(8)$ and $Q_f(8)$ depend on (refer to FIG. 11(2)).

In this case, when assuming that the received-signal-phase rotation angle $\Theta_w$ is previously detected, the remapper 7A outputs absolute-phase-generated $I_{0f}(8)$ and $Q_{0f}(8)$ obtained by inversely phase-rotating $I_f(8)$ and $Q_f(8)$ by $-\Theta_w$. Because CR(3) output by the phase-error detecting circuit 70 is equal to $(\Theta_w+\Theta')$, a received-signal point $P_{1f}$ according to $RI_{1f}(1)$ and $RQ_{1f}(1)$ shown by CR(3) phase-rotated by $-(\Theta_w+\Theta')$ by the remapper 7A is kept in a range of $\pi/4$ about a phase 0 on I-Q phase plane as shown in FIG. 9(2) even if $\Theta$ changes from an initial value 0 to $\Theta_w$. Moreover, because the difference between phase angle $\phi_{0f}$ and target phase convergent angle of received-signal point $P_{0f}$ is equal to the phase angle $\phi_{1f}$ of the received-signal point $P_{1f}$, the phase-error detecting circuit 70 is able to output the correct phase error data $\Delta\phi_f(8)'=\Delta\phi_{1f}(8)$ to the D/A converter 17 when regarding that the data follows the 8PSK modulation system by receiving phase error data $\Delta\phi_{1f}(8)$ corresponding to $RI_{1f}(1)$ and $RQ_{1f}(1)$ from the phase error table 15-1A and latching the data $\Delta\phi_{1f}(8)$.

(2) Normal Receiving Operation

Hereafter, the normal receiving operation is described by assuming that, for example, $\Theta_w$ is equal to $3\pi/4$ (AR(3)=(011)).

(i) 8PSK-modulation-system Portion (Refer to FIG. 9.)

When the transmission-configuration identifying circuit 9 identifies a multiple configuration and outputs a modulation-system identifying signal DM showing in which modulation-system portion the present I and Q symbol streams $I_f(8)$ and $Q_f(8)$ output from the demodulating circuit 1A are included after operations of the received-signal-phase-rotation-angle detecting circuit 8, the selector 80 of the phase-error detecting circuit 70 selects and outputs an output of the adder 78 when the DM shows 8PSK. A received-signal point of a digital signal (abc) 8PSK-mapped to a transmission-side signal point arrangement "3" is kept in a range of $\pi/4$ about a phase $6\pi/4$ of a signal point arrangement "6" when viewed through, for example, $\Theta_w=3\pi/4$ and $I_f(8)$ and $Q_f(8)$ serving as outputs of the demodulating circuit 1A. However, a received-signal point $P_{0f}$ according to outputs $I_{0f}(8)$ and $Q_{0f}(8)$ of the remapper 7A is kept in a range of $\pi/4$ about the phase $3\pi/4$ of the signal point arrangement "3" due to absolute phase generation similarly to the case of the transmission side.

In this case, because $BR(3)=BP_{8PSK}(3)$ is set to (011) showing $\Theta'=3\pi/4$ and $(\Theta_w+\Theta')=6\pi/4$, a received-signal point $P_{1f}$ according to $I_{1f}(8)$ and $Q_{1f}(8)$ is kept in a range of $\pi/4$ about a phase 0. Because the difference between the phase angle $\phi_{0f}$ and a target phase convergent angle of the received-signal point $P_{0f}$ is equal to the phase angle $\phi_{1f}$ of the received-signal point $P_{1f}$, the phase-error detecting circuit 70 is able to output phase error data for converging received-signal points viewed through $RI_{0f}(8)$ and $RQ_{0f}(8)$ into a phase $3\pi/4$ to a D/A converter 18 by reading phase error data $\Delta\phi_{1f}(8)$ corresponding to $RI_{1f}(8)$ and $RQI_f(8)$ out of the phase error table 15-1A and latching the data $\Delta\phi_{1f}(8)$. Also for digital signals (abc) 8PSK-mapped to other signal point arrangements "0," "1," "2," "4," "5," "6," and "7" at the transmission side, the circuit 70 is able to output phase error data for converging received-signal points viewed through outputs $RI_{0f}(8)$ and $RQ_{0f}(8)$ of the remapper 7A into phases 0, $\pi/4$, $2\pi/4$, $4\pi/4$, $5\pi/4$, $6\pi/4$, and $7\pi/4$ to the D/A converter 18 in the completely same manner as the above described.

(ii) QPSK-modulation-system Portion

The selector 80 of the phase-error detecting circuit 70 selects and outputs an output of the selector 74 when DM shows QPSK. For example, a received-signal point of a digital signal (de) QPSK-mapped to a transmission-side signal point arrangement "7" is kept in a range of $2\pi/4$ about a phase $2\pi/4$ of a signal point arrangement "2" when viewed through $I_f(8)$ and $Q_f(8)$ which are outputs of the demodulating circuit 1A. However, a received-signal point $P_{0f}$ according to outputs $I_{0f}(8)$ and $Q_{0f}(8)$ of the remapper 7A is kept in a range of $2\pi/4$ about a phase $7\pi/4$ of the signal point arrangement "7" due to absolute phase generation similarly to the case of the transmission side.

In this case, because $BR(3)=BR_{QPSK}(3)$ becomes (111) showing $\Theta'=7\pi/4$ and $(\Theta_w+\Theta')$ is equal to $2\pi/4$, a received-signal point $P_{1f}$ according to $I_{1f}(8)$ and $Q_{1f}(8)$ is kept in a range of $2\pi/4$ about a phase 0. Because the difference between the phase angle $\phi_{0f}$ and a target phase convergent angle of a received-signal point $P_{0f}$ is equal to the phase angle $\phi_{1f}$ of the received-signal point $P_{1f}$, the phase-error detecting circuit 70 is able to output phase error data for converging a received-signal point viewed through $RI_{0f}(8)$ and $RQ_{0f}(8)$ into a phase $7\pi/4$ to the D/A converter 18 by reading phase error data $\Delta\phi_{1f}(8)$ corresponding to $RI_f(8)$ and $RQ_{1f}(8)$ out of the phase error table 15-1A and latching the data $\Delta\phi_{1f}(8)$. Also for digital signals (de) QPSK-mapped to other signal point arrangements "1," "3," and "5" at the transmission side, the circuit 70 is able to output phase error data for converging received-signal points viewed through outputs $RI_{0f}(8)$ and $RQ_{0f}(8)$ of the remapper 7A into phases $\pi/4$, $3\pi/4$, and $5\pi/4$ to the D/A converter 18 in the completely same manner as the above.

(iii) BPSK-modulation-system Portion

The selector 80 of the phase-error detecting circuit 70 selects and outputs an output of the selector 74 when DM shows QPSK. For example, a received-signal point of a digital signal (f) BPSK-mapped to a transmission-side signal point arrangement "1" is kept in a range of $4\pi/4$ about a phase $7\pi/4$ of a signal point arrangement "7" when viewed through $I_f(8)$ and $Q_f(8)$ which are outputs of the demodulating circuit 1A. However, a received-signal point Pot according to outputs $I_{0f}(8)$ and $Q_{0f}(8)$ of the remapper 7A is kept in a range of $4\pi/4$ about a phase $7\pi/4$ of the signal point arrangement "1" due to absolute phase generation similarly to the case of the transmission side.

In this case, because $BR(3)=BR_{BPSK}(3)$ becomes (100) showing $\Theta'=4\pi/4$ and $(\Theta_w+\Theta')$ is equal to $7\pi/4$, a received-signal point $P_{1f}$ according to $I_{1f}(8)$ and $Q_{1f}(8)$ is kept in a range of $4\pi/4$ about a phase $4\pi/4$. Because the difference between a phase angle $\phi_{0f}$ and a target phase convergent angle of a received-signal point $P_{0f}$ is equal to the phase angle $\phi_{1f}$ of the received-signal point $P_{1f}$, the phase-error detecting circuit 70 is able to output phase error data for converging a received-signal point viewed through $RI_{0f}(8)$ and $RQ_{0f}(8)$ into a phase $4\pi/4$ to the D/A converter 18 by reading phase error data $\Delta\phi_{1f}(8)$ corresponding to $RI_f(8)$ and $RQ_{1f}(8)$ out of the phase error table 15-1A and latching the data $\Delta\phi_{1f}(8)$. Also for a digital signal BPSK-mapped to a signal point arrangement "0" at the transmission side, the circuit 70 is able to output phase error data for converging received-signal points viewed through outputs $RI_{0f}(8)$ and $RQ_{0f}(8)$ of the remapper 7A into a phase 0 to the D/A converter 18 in the completely same manner as the above.

The received-signal-phase-rotation-angle detecting circuit 8 repeatedly detects a received-signal-phase rotation angle. Also when $\Theta_w$ has a value other than $3\pi/4$, the phase-error detecting circuit 70 completely similarly operates. Therefore, the circuit 70 is able to output phase error data for converging a received-signal point viewed from the output side of the remapper 1A into a phase same as that of the transmission side to the D/A converter 18 independently of a modulation system or a value $\Theta_w$ of an original digital signal.

According to this embodiment, the remapper 7A outputs I and Q symbol-stream data Iot and $Q_{0t}$ absolute-phase-generated by inversely phase-rotating I and Q symbol-stream data $I_t$ and $Q_t$ for each symbol output from the demodulating circuit 1A by $-\Theta$ and moreover, outputs I and Q symbol-stream data $I_{1t}$ and $Q_{1t}$ inversely phase-rotated by $-(\Theta+\Theta')$ by assuming a shift angle up to a target phase convergent angle of a received-signal point shown by an absolute-phase-generated I and Q symbol-stream data set viewed in the positive direction or negative direction of I-axis included in a phase error table for each modulation system through time sharing as $\Theta'$. By using the set of the I and Q symbol-stream data $I_{1t}$ and $Q_{1t}$, the phase-error detecting circuit 70 reads phase error data $\Delta\phi_{1t}(8)$ out of the phase error table 15-1A. The phase error data $\Delta\phi_{1t}(8)$ serves as data corresponding to a modulation system of a received signal currently demodulated by the demodulating circuit 1A, a received-signal-phase rotation angle $\Theta$ against the transmission side viewed from an output point of the demodulating circuit 1A, and a phase angle $\phi$ of a received-signal point. Therefore, it is enough to provide only one phase error table for the carrier-wave regenerating circuit 10A and thus, it is possible to decrease the number of phase error tables to be provided for the carrier-wave regenerating circuit 10A and greatly simplify a circuit configuration.

Figure 10:
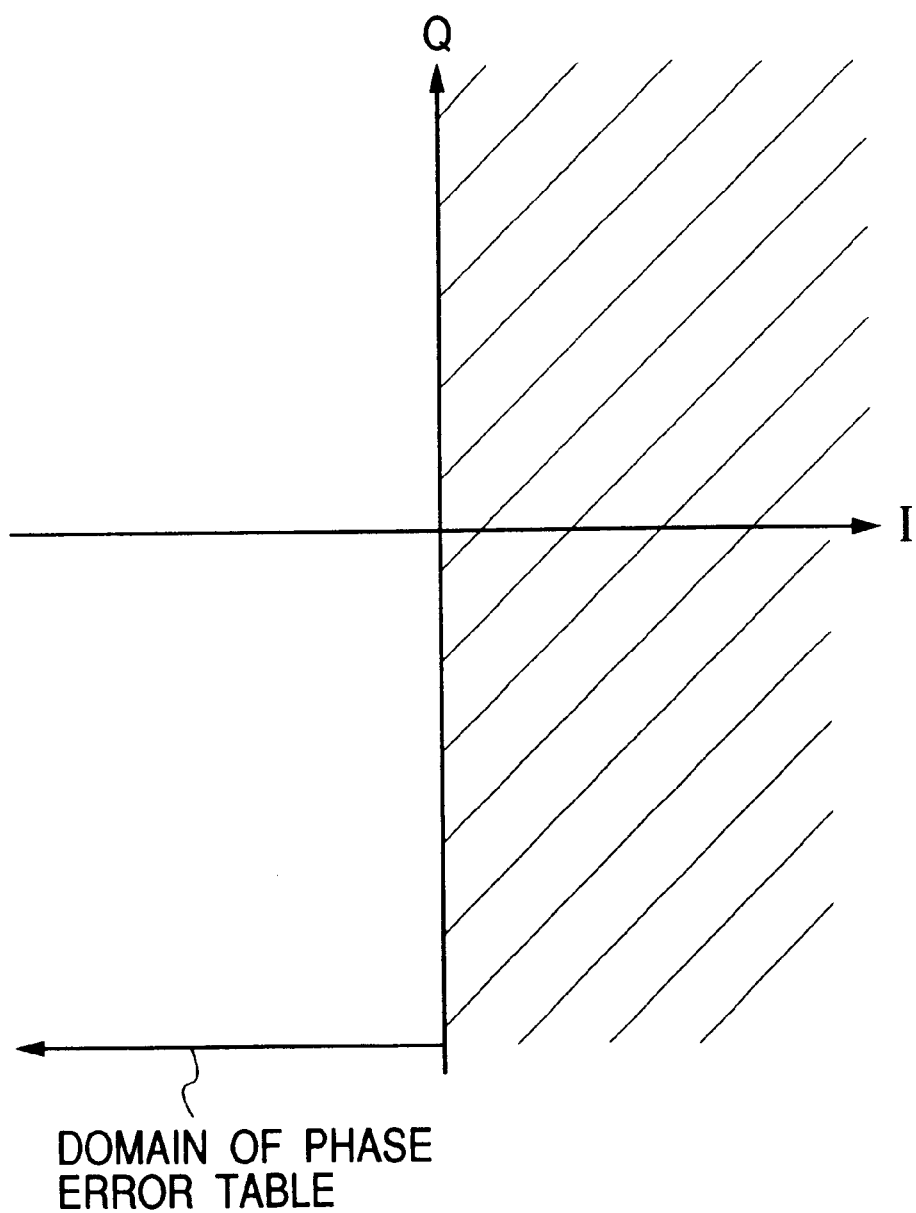
FIG. 10 is an illustration of a domain of the phase error table of a modification of the present invention.

In the case of the above embodiment, a table using an area of I$\geq$0 of I-Q phase plane as a domain is provided for the phase error table 15-1A. However, it is also permitted to provide a table using an area of I$\leq$0 as a domain for the phase error table 15-1A (refer to FIG. 10). In this case, BR(3) output by the selector 80 of the phase-error detecting circuit 70 is set so as to show a shift angle $\Theta'$ up to a target phase convergent angle of a received-signal point shown by I and Q symbol-stream data for each symbol after absolute-phase-generated by the remapper 7A viewed in the negative direction of I-axis according to a modulation system currently demodulated by a demodulating circuit.

Specifically, it is preferable to set the selector 73 in FIG. 7 so as to output (100) when an output Ri(1) of the latch circuit 71 shows an output RI(8)>0 of the remapper 7A and output (000) when the output Ri(1) shows RI(8)$\leq$0; set the selector 74 so as to select and output (001) for RI(8)<0 and RQ(8)<0, (011) for RI(8)$\geq$0 and RQ(8)<0, (101) for RI(8)$\geq$0 and RQ(8)$\geq$0, (111) for RI(8)<0 and RQ(8)$\geq$0 in accordance with the combination of positive and negative of RI(8) and RQ(8) shown by the outputs Ri(1) and Rq(1) of the latch circuits 71 and 72; and set the selector 76 so as to directly input the outputs RI(8) and RQ(8) of the remapper 7A to the phase error table 15-1A when Ri(1) shows RI(8)$\leq$0 and input $-$RI(8) and $-$RQ(8) serving as the outputs of the inverting circuit 75 to the phase error table 15-1A when Ri(1) shows RI(8)$\geq$0 while $CLK_{SYB}$ is inactivated. Moreover, while the $CLK_{SYB}$ is activated, it is preferable to set the selector 76 so as to directly input RI(8) and RQ(8) output from the remapper 7A to the phase error table 15-1A.

Furthermore, it is permitted to provide a table using the whole area of I-Q phase plane as a domain for the phase error table 15-1A. In this case, it is preferable to set the BR(3) output by the selector 80 of the phase-error detecting circuit 70 so as to show a shift angle $\Theta'$ up to a target phase convergent angle of a received-signal point shown by I and Q symbol-stream data for each symbol after absolute-phase-generated by the remapper 7A viewed in either of the positive direction and negative direction of I-axis according to a modulation system currently demodulated by a demodulating circuit. For example, to show a shift angle $\Theta'$ viewed in the positive direction of I-axis, it is preferable to omit the selector 73 in FIG. 7, input $BR_{BPSK}(3)$=(000) to the selector 80; set the selector 74 so as to select and output (001) for RI(8)$\geq$0 and RQ(8)$\geq$0, (011) for RI(8)<0 and RQ(8)$\geq$0, (101) for RI(8)<0 and RQ(8)<0, and (111) for RI(8)$\geq$0 and RQ(8)<0 in accordance with the combination of positive and negative of RI(8) and RQ(8) shown by Ri(1) and Rq(1); omit the inverting circuit 75 and selector 76 to directly input the outputs RI(8) and RQ(8) of the remapper 7A to the phase error table 15-1A; and omit the selector 79 to input a fixed value (0101) to the adder 78.

INDUSTRIAL APPLICABILITY

According to the present invention, it is enough to provide only one phase error table for carrier-wave regenerating means and thereby, it is possible to decrease the number of phase error tables to be provided for the carrier-wave regenerating means and greatly simplify a circuit configuration.

What is claimed is:

1. A receiver comprising:

demodulating means for demodulating a signal to be PSK-modulated in which digital signals modulated by a plurality of PSK modulation systems having a different number of phases are time-multiplexed by using carrier waves regenerated by carrier-wave regenerating means and outputting symbol data;

received-signal-phase-rotation-angle detecting means for detecting a phase rotation angle of each symbol data output from the demodulating means against the transmission side;

inversely-phase-rotating means for inversely rotating the phase of each symbol data output from the demodulating means by a phase rotation angle detected by the received-signal-phase-rotation-angle detecting means and thereby, absolute-phase-generating the phase of each symbol data and outputting the phase; and modulation-system identifying means for identifying a modulation system currently demodulated by the demodulating means; characterized in that the inversely-phase-rotating means rotates the phase of each symbol data output from the demodulating means by two types of phase rotation angles through time sharing and outputs the phase rotation angles and one of the two types is equal to the inverse phase rotation angle, the carrier-wave regenerating means is provided with a phase error table storing carrier-wave phase error data for various symbol data after absolute-phase-generated according to the PSK modulation system having the minimum number of phases and phase-error detecting means for detecting a phase error of a regenerated carrier wave by obtaining a shift angle up to a target phase convergent angle of a received-signal point shown by the absolute-phase-generated symbol data for each symbol viewed in the positive direction or negative direction of I-axis included in a phase error table according to a modulation system identified by the modulation-system identifying means and reading carrier-wave phase error data corresponding to symbol data inversely phase-rotated by an angle corresponding to the sum of the other phase rotation angle of the two types of phase rotation angles of each symbol data and a shift angle up to a target phase convergent angle against the transmission side phase-rotated by the inversely-phase-rotating means through the time sharing out of a phase error table, and a phase of a regenerated carrier wave is corrected in accordance with the carrier-wave phase error data detected by the phase-error detecting means.

2. A receiver comprising:

demodulating means for demodulating a signal to be PSK-modulated in which digital signals modulated in accordance with 2-phase, 4-phase, and 8-phase PSK modulation systems are time-multiplexed by using carrier waves regenerated by carrier-wave regenerating means and outputting I and Q symbol-stream data for each symbol;

received-signal-phase-rotation-angle detecting means for detecting a phase rotation angle $\Theta$ of I and Q symbol-stream data for each symbol output from the demodulating means against the transmission side;

inversely-phase-rotating means for rotating a phase of I and Q symbol-stream data for each symbol output from the demodulating means by $-\Theta$ against a phase rotation angle $\Theta$ detected by the received-signal-phase-rotation-angle detecting means, generating the absolute phase of the I and Q symbol-stream data, and outputting the data; and modulation-system identifying means for identifying a modulation system currently demodulated by the demodulating means; characterized in that the inversely-phase-rotating means rotates a phase of I and Q symbol-stream data for each symbol output from the demodulating means by only two types of phase rotation angles through time sharing and outputs the phase of the I and Q symbol-stream data, and one of the two types of the phase rotation angles is equal to the above $-\Theta$, the carrier-wave regenerating means is provided with a phase error table storing carrier-wave phase error data for various I and Q symbol-stream data sets after absolute-phase-generated by the 2-phase PSK-modulation system and phase-error detecting means for detecting a phase error of a regenerated carrier wave by obtaining a shift angle $\Theta'$ up to a target phase convergent angle of a received-signal point shown by an absolute-phase-generated I and Q symbol-stream data set for each symbol viewed in the positive direction or negative direction of I-axis included in a phase error table according to a modulation system identified by the modulation-system identifying means and reading carrier-wave phase error data corresponding to an I and Q symbol-stream data set phase-rotated by $-(\Theta+\Theta')$ as the other one of the two types phase-rotated by the inversely-phase-rotating means through the time sharing out of a phase error table, and a phase of a regenerated carrier wave is corrected in accordance with the carrier-wave phase error data detected by the phase-error detecting means.

\* \* \* \* \*